United States Patent
Pascal et al.

(10) Patent No.: US 12,458,284 B2
(45) Date of Patent: Nov. 4, 2025

(54) OCT GUIDED THERAPY

(71) Applicant: Notal Vision Ltd., Tel Aviv (IL)

(72) Inventors: Amit Pascal, Haifa (IL); Kester Nahen, Centreville, VA (US); Hanoch Gideon Benyamini, Ramat Hasharon (IL); Omer Rafaeli, Udim (IL); Yair Alster, Tel Aviv (IL); Moshe Havilio, Tel Aviv (IL); Yael Alon, Rishon LeZion (IL); Elad Bergman, Tel Aviv (IL)

(73) Assignee: Notal Vision, Ltd., Tel Aviv (IL)

( * ) Notice: Subject to any disclaimer, the term of this patent is extended or adjusted under 35 U.S.C. 154(b) by 38 days.

(21) Appl. No.: 18/132,567

(22) Filed: Apr. 10, 2023

(65) Prior Publication Data

US 2023/0277126 A1    Sep. 7, 2023

Related U.S. Application Data

(63) Continuation of application No. PCT/IB2021/059250, filed on Oct. 8, 2021.

(60) Provisional application No. 63/089,404, filed on Oct. 8, 2020.

(51) Int. Cl.
| | |
|---|---|
| A61B 5/00 | (2006.01) |
| A61B 3/10 | (2006.01) |
| A61F 9/00 | (2006.01) |
| G16H 20/17 | (2018.01) |
| G16H 30/40 | (2018.01) |
| G16H 40/67 | (2018.01) |

(52) U.S. Cl.
CPC ............ *A61B 5/4848* (2013.01); *A61B 3/102* (2013.01); *A61F 9/0017* (2013.01); *G16H 20/17* (2018.01); *G16H 30/40* (2018.01); *G16H 40/67* (2018.01)

(58) Field of Classification Search
CPC ..... A61B 3/102; A61B 5/4848; A61F 9/0017; G16H 20/17; G16H 30/40; G16H 40/20; G16H 40/67; G16H 50/20
See application file for complete search history.

(56) References Cited

U.S. PATENT DOCUMENTS

| | | |
|---|---|---|
| 10,595,722 B1 | 3/2020 | Pascal et al. |
| 10,653,314 B2 | 5/2020 | Pascal et al. |
| 11,058,299 B2 | 7/2021 | Rafaeli et al. |
| 11,564,564 B2 | 1/2023 | Pascal et al. |

(Continued)

FOREIGN PATENT DOCUMENTS

EP     3065761 B1     1/2020

OTHER PUBLICATIONS

Bogunovic et al., "Chapter 14—OCT Fluid Detection and Quantification", Computational Retinal Image Analysis, 2019, pp. 273-298.

(Continued)

*Primary Examiner* — Michael T Rozanski
(74) *Attorney, Agent, or Firm* — Kilpatrick Townsend & Stockton LLP

(57) ABSTRACT

Systems and relative method of monitoring the state of a subject's retinal disease employ remote based OCT imaging of a subject's retina. A method includes receiving optical coherence tomography (OCT) image data of a retina of a subject for each of a series of OCT imaging sessions of the retina. The OCT image data of the retina is processed to determine a series of measured extent values. Each of the one or more measured extent values is indicative of a respective extent of the retinal disease.

25 Claims, 8 Drawing Sheets

(56) References Cited

U.S. PATENT DOCUMENTS

| | | | |
|---|---|---|---|
| 2007/0115481 | A1 | 5/2007 | Toth et al. |
| 2007/0121070 | A1 | 5/2007 | Alster et al. |
| 2009/0161826 | A1 | 6/2009 | Gertner et al. |
| 2012/0184845 | A1 | 7/2012 | Ishikawa et al. |
| 2013/0116664 | A1 | 5/2013 | Tai et al. |
| 2015/0150456 | A1 | 6/2015 | Brennan et al. |
| 2017/0348095 | A1 | 12/2017 | Wortz et al. |
| 2018/0132725 | A1 | 5/2018 | Vogl et al. |
| 2018/0263490 | A1 | 9/2018 | Jia et al. |
| 2018/0289442 | A1 | 10/2018 | Journey et al. |
| 2019/0090733 | A1 | 3/2019 | Walsh et al. |
| 2019/0110753 | A1 | 4/2019 | Zhang et al. |
| 2020/0075155 | A1 | 3/2020 | Huang |
| 2020/0196858 | A1 | 6/2020 | Scheibler et al. |
| 2021/0348193 | A1 | 11/2021 | Robinson et al. |
| 2021/0369195 | A1 | 12/2021 | Russakoff et al. |

OTHER PUBLICATIONS

Chakravarthy et al., "Automated Identification of Lesion Activity in Neovascular Age-Related Macular Degeneration", Opthalmology, vol. 123, No. 8, Aug. 2016, 6 pages.

Fernandez, "Delineating Fluid-Filled Region Boundaries in Optical Coherence Tomography Images of the Retina", Institute of Electrical and Electronics Engineers Transactions on Medical Imaging, vol. 24, No. 8, Aug. 2005, pp. 929-945.

Venhuizen et al., "Deep Learning Approach for the Detection and Quantification of Intraretinal Cystoid Fluid in Multivendor Optical Coherence Tomography", Biomedical Optics Express, vol. 9, No. 4, Apr. 1, 2018, pp. 1545-1569.

OCT GUIDED THERAPY

CROSS REFERENCE TO RELATED APPLICATIONS

The present application is a Continuation of PCT/IB2021/059250 filed Oct. 8, 2021; which claims the benefit of U.S. Provisional Application No. 63/089,404 filed Oct. 8, 2020, the disclosures which are incorporated herein by reference in their entirety for all purposes.

BACKGROUND

Macular degeneration is the leading cause of vision loss in the United States of America. In macular degeneration, the central portion of the retina (a.k.a., the macula) deteriorates. When healthy, the macula collects and sends highly detailed images to the brain via the optic nerve. In early stages, macular degeneration typically does not significantly affect vision. If macular degeneration progresses beyond the early stages, vision becomes wavy and/or blurred. If macular degeneration continues to progress to advanced stages, central vision may be lost.

Although macular degeneration is currently considered to be incurable, treatments do exist that may slow the progression of the disease so as to prevent severe loss of vision. Treatment options include injection of an anti-angiogenic drug into the eye, laser therapy to destroy an actively growing abnormal blood vessel(s), and photodynamic laser therapy, which employs a light-sensitive drug to damage an abnormal blood vessel(s). Early detection of macular degeneration is of paramount importance in preventing advanced progression of macular degeneration prior to treatment to inhibit progression of the disease.

Early detection of macular degeneration can be accomplished using a suitable retinal imaging system. For example, Optical Coherence Tomography (OCT) is a non-invasive imaging technique relying on low coherence interferometry that can be used to generate a cross-sectional image of the macula. The cross-sectional view of the macula shows if the layers of the macula are distorted and can be used to monitor whether distortion of the layers of the macula has increased or decreased relative to an earlier cross-sectional image to assess the impact of treatment of the macular degeneration.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In many embodiments, short-interval monitoring of the state of a subject's retinal disease, for example on a daily basis, using optical coherence tomography (OCT) imaging of a retina of a subject is used to provide valuable information to a treating physician. In many embodiments, OCT image data of the retina is generated by an affordable OCT based ophthalmic imaging devices that can be used by a subject at home on a short-interval basis to monitor the state of the subject's retinal disease. The short-interval monitoring enables more accurate tracking of the state of the subject's retinal disease and the development of treatment approaches that are based on day to day changes in the state of the subject's retinal disease as opposed to hit or miss treatment approaches that can be employed when the state of the subject's retinal disease is checked on typical current intervals (e.g., once a month, once each 5 weeks, once each 6 weeks, etc.). In many embodiments, the short-interval monitoring enables improved scheduling of the application of a treatment (e.g., the injection of a therapeutic compound into the subject's eye) for the subject's retinal disease. In some embodiments, the short-interval monitoring can be used to formulate a customized treatment regime for a subject based on observed progression of the subject's retinal disease and/or observed response of the subject's retinal disease to one or more prior treatment applications.

Thus, in one aspect, a system for tracking the state of a retinal disease of an eye of a subject includes a communication unit, at least one processor, and a tangible storage device storing non-transitory instructions. The communication unit is configured to receive optical coherence tomography (OCT) image data of a retina of a subject for each of a series of OCT imaging sessions of the retina having a suitable imaging frequency (e.g., at least once every two weeks, at least once a week, at least once every three days, at least once every two days, at least once every day). The non-transitory instructions are executable by the at least one processor to cause the at least one processor to process the OCT image data of the retina to determine a series of measured extent values. Each of the series of measured extent values is indicative of a respective extent of the retinal disease. The instructions can further cause the processor to generate an output indicative of the series of the measured extent values.

In many embodiments of the system, the series of OCT imaging sessions of the retina is conducted over a treatment interval for a retinal disease. For example, in some retinal diseases, a treatment interval (e.g., time span between injections of a therapeutic compound into the subject's eye) may be about a month or longer (e.g., 4 weeks, 5 weeks, 6 weeks, 7 weeks, or longer). Conducting the series of OCT imaging sessions over a treatment interval provides visibility regarding the extent of the retinal disease at time points between treatments. As a result, the extent of the retinal disease between treatment applications can be measured and tracked, thereby providing a treating medical professional with feedback as to any regression and/or progression of the extent of the retinal disease between treatment applications. The series of OCT imaging sessions can be conducted over any suitable time span and at any suitable frequency. For example, the series of OCT imaging sessions can be conducted over at least one month or longer to cover at least one time span between treatment applications. The series of OCT imaging sessions can have an imaging frequency of at least once every two weeks, at least once a week, at least once every three days, or at least once a day.

In some embodiments of the system, the measured extent values are indicative of an amount of fluid within the retina. For example, at least one of the series of measured extent values can be indicative of a length of an intra-retinal fluid volume detected via the series of OCT imaging sessions of the retina. At least one of the series of measured extent values can be indicative of a depth of an intra-retinal fluid volume detected via the series of OCT imaging sessions of the retina. At least one of the series of measured extent values can be indicative of a volume of an intra-retinal fluid volume detected via the series of OCT imaging sessions of the retina. At least one of the series of measured extent values can be indicative of a length of a sub-retinal fluid volume detected via the series of OCT imaging sessions of the retina. At least one of the series of measured extent values can be indicative of a depth of a sub-retinal fluid volume detected via the series of OCT imaging sessions of the retina. At least one of the series of measured extent values can indicative of a volume of a sub-retinal fluid volume detected via the series of OCT imaging sessions of the retina.

In many embodiments, the system is configured to generate and send a notification to a designated treating professional for the subject in response to the subject's retinal disease progressing to or past a selected threshold to enable scheduling of application of a treatment for the subject's retinal disease based on the observed progression of the subject's retinal disease. For example, in some embodiments, the non-transitory instructions further cause the at least one processor to compare at least one of the series of measured extent values with a respective threshold extent value and, in response to at least one of the series of measured extent values equaling or exceeding the respective threshold extent value, transmit a communication to a treating professional when at least one of the series of measured extent values exceeds the respective threshold extent value. In some embodiments, the non-transitory instructions further cause the at least one processor to compare at least one of the series of measured extent values with a respective threshold extent value and, in response to at least one of the series of measured extent values equaling or exceeding the respective threshold extent value, induce remote treatment of the retinal disease via operation of an implanted pump to inject a therapeutic compound into the eye.

In many embodiments of the system, the non-transitory instructions further cause the at least one processor to transmit at least one of the series of measured one or more extent values to a treating professional to enable tracking of the progress of the retinal disease by the treating professional. In some embodiments, the non-transitory instructions further cause the at least one processor to transmit a graph of the at least one of the series of measured extent values to the treating professional. In some embodiments, the non-transitory instructions further cause the at least one processor to display at least one of the series of measured extent values to the treating professional.

In some embodiments, the system is configured to determine parameters that are descriptive of the extent of the subject's retinal disease in between treatment applications. For example, in some embodiments, the system is configured to measure the extent of intra-retinal fluid within the retina. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculate at least one fluid present interval, within the treatment interval, during which an intra-retinal fluid volume is detected in each of the series of OCT imaging sessions of the retina accomplished within the fluid present interval. The non-transitory instructions can further cause the at least one processor to calculate a fluid absence interval, within the treatment interval, during which an intra-retinal fluid volume is not detected via each of the series of OCT imaging sessions of the retina accomplished within the treatment interval. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculate a fluid regression interval, within the treatment interval, during which an intra-retinal fluid volume detected in the series of OCT imaging sessions of the retina is reducing in volume during the fluid regression interval. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculate a fluid increase interval, within the treatment interval, during which an intra-retinal fluid volume detected in the series of OCT imaging sessions of the retina is increasing in volume during the fluid increase interval. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) determine a maximum thickness of an intra-retinal fluid volume detected via the series of OCT imaging sessions of the retina during the treatment interval. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) determine a maximum volume of an intra-retinal fluid volume detected via the series of OCT imaging sessions of the retina during the treatment interval.

In some embodiments, the system is configured to measure the extent of sub-retinal fluid within the retina. For example, in some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculate at least one fluid present interval, within the treatment interval, during which a sub-retinal fluid volume is detected in each of the series of OCT imaging sessions of the retina accomplished within the fluid present interval. In some embodiments, the non-transitory instructions further cause the at least one processor to calculate a fluid absence interval, within the treatment interval, during which a sub-retinal fluid volume is not detected via each of the series of OCT imaging sessions of the retina accomplished within the treatment interval. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculate a fluid regression interval, within the treatment interval, during which a sub-retinal fluid volume detected in the series of OCT imaging sessions of the retina is reducing in volume during the fluid regression interval. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculate a fluid increase interval, within the treatment interval, during which a sub retinal fluid volume detected in the series of OCT imaging sessions of the retina is increasing in volume during the fluid increase interval. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) determine a maximum thickness of an sub-retinal fluid volume detected via the series of OCT imaging sessions of the retina during the treatment interval. In some embodiments, the non-transitory instructions further cause the at least one processor to: (a) store a first date of treatment for a first treatment of the retinal disease, (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) determine a maximum volume of a sub-retinal fluid volume detected via the series of OCT imaging sessions of the retina during the treatment interval.

In some embodiments, the system is configured to monitor compliance of a subject with a specified schedule for imaging of the subject's retina. For example, in some embodiments of the system, the OCT imaging data comprises imaging date data indicative of a date of occurrence of each of the series of OCT imaging sessions of the retina and the non-transitory instructions further cause the at least one processor to: (a) process the imaging date data to monitor for non-compliance by the subject with a specified schedule for conducting the series of OCT imaging sessions of the retina, and (b) in response to detecting non-compliance by the subject with the specified schedule for conducting the series of OCT imaging sessions of the retina, transmit a reminder to the subject to comply with the specified schedule for conducting the series of OCT imaging sessions of the retina.

In some embodiments, the system is configured to assess the severity of the subject's retinal disease. For example, in some embodiments, the non-transitory instructions further cause the at least one processor to generate a severity score indicative of a severity of the retinal disease based on the OCT imaging data.

In some embodiments, the system is configured to generate a recommendation for a treatment of a subject's retinal disease. For example, in some embodiments, the non-transitory instructions further cause the at least one processor to generate a recommendation for a treatment of the retinal disease based on the OCT imaging data. The recommendation for the treatment can include a recommended date for an injection of a therapeutic compound into the eye. The recommendation for the treatment can include a recommended volume of a therapeutic compound for injection into the eye and/or a recommended composition of the therapeutic compound.

The system can be configured to track the progression of any suitable retinal disease. For example, in some embodiments of the system, retinal diseases that can be tracked can include pigment epithelium detachment, Drusen, chorioretinal eye diseases, such as AIMD, ocular hystoplasmosis, myopia, central serous retinopathy, central serous choroidopathy, glaucoma, diabetic retinopathy, retintis pigmentosa, optic neuritis, epiretinal membrane, vascular abnormalities and/or occlusions, choroidal dystrophies, retinal dystrophies, macular hole, or choroidal or retinal degeneration.

In another aspect, a method of tracking progress of a retinal disease of a subject includes receiving, by a computing system, optical coherence tomography (OCT) image data of a retina of a subject for each of a series of OCT imaging sessions of the retina having a suitable imaging frequency (e.g., at least once every two weeks, at least once a week, at least once every three days, at least once every two days, at least once every day). The OCT image data of the retina is processed by the computer system to determine a series of measured extent values, wherein each of the series of measured extend values is indicative of a respective extent of the retinal disease. An output indicative of the series of the measured extent values is output by the computer system.

In many embodiments of the method, the series of OCT imaging sessions of the retina is conducted over a treatment interval for a retinal disease. For example, in some retinal diseases, a treatment interval (e.g., time span between injections of a therapeutic compound into the subject's eye) may be about a month or longer (e.g., 4 weeks, 5 weeks, 6 weeks, 7 weeks, or longer). Conducting the series of OCT imaging sessions over a treatment interval provides visibility regarding the extent of the retinal disease at time points between treatments. As a result, the response of the retinal disease between treatment applications can be measured and tracked, thereby providing a treating medical professional with feedback as to any regression and/or progression of the extent of the retinal disease between treatment applications. The series of OCT imaging sessions can be conducted over any suitable time span and at any suitable frequency. For example, the series of OCT imaging sessions can be conducted over at least one month or longer to cover at least one time span between treatment applications. The series of OCT imaging sessions can have an imaging frequency of at least once every two weeks, at least once a week, at least once every three days, or at least once a day.

In some embodiments of the method, the measured extent values are indicative of an amount of fluid within the retina. For example, at least one of the series of measured extent values can be indicative of a length of an intra-retinal fluid volume detected via the series of OCT imaging sessions of the retina. At least one of the series of measured extent values can be indicative of a depth of an intra-retinal fluid volume detected via the series of OCT imaging sessions of the retina. At least one of the series of measured extent values can be indicative of a volume of an intra-retinal fluid volume detected via the series of OCT imaging sessions of the retina. At least one of the series of measured extent values can be indicative of a length of a sub-retinal fluid volume detected via the series of OCT imaging sessions of the retina. At least one of the series of measured extent values can be indicative of a depth of a sub-retinal fluid volume detected via the series of OCT imaging sessions of the retina. At least one of the series of measured extent values can indicative of a volume of a sub-retinal fluid volume detected via the series of OCT imaging sessions of the retina.

In many embodiments, the method includes generating and sending a notification to a designated treating professional for the subject in response to the subject's retinal disease progressing to or past a selected threshold to enable scheduling of application of a treatment for the subject's retinal disease based on the observed progression of the subject's retinal disease. For example, in some embodiments, the method includes comparing, by the computer system, at least one of the series of measured extent values with a respective threshold extent value and, in response to at least one of the series of measured extent values equaling or exceeding the respective threshold extent value, transmitting, by the computer system, a communication to a treating professional when at least one of the series of measured extent values exceeds the respective threshold extent value. In some embodiments, the method further includes comparing, by the computer system, at least one of the series of measured extent values with a respective threshold extent value and, in response to at least one of the series of measured extent values equaling or exceeding the respective threshold extent value, inducing, by the computer system, remote treatment of the retinal disease via operation of an implanted pump to inject a therapeutic compound into the eye.

In many embodiments, the method includes transmitting, by the computer system, at least one of the series of measured one or more extent values to a treating professional to enable tracking of the progress of the retinal disease by the treating professional. In some embodiments, the method includes transmitting, by the computer system, a graph of the at least one of the series of measured extent values to the treating professional. In some embodiments, the method includes displaying, by the computer system, at least one of the series of measured extent values to the treating professional.

In some embodiments, the method includes determining, by the computer system, parameters that are descriptive of the extent of the subject's retinal disease in between treatment applications. For example, in some embodiments, the method includes measuring and tracking the extent of intra-retinal fluid within the retina. For example, in some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculating, by the computer system, at least one intra-retinal fluid present interval, within the treatment interval, during which an intra-retinal fluid volume is detected in each of the series of OCT imaging sessions of the retina accomplished within the intra-retinal fluid present interval. The method can include calculating, by the computer system, a fluid absence interval, within the treatment interval, during which an intra-retinal fluid volume is not detected in each of the series of OCT imaging sessions of the retina accomplished within the fluid absence interval. In some embodiments, the method includes (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculating, by the computer system, an intra-retinal fluid regression interval, within the treatment interval, during which an intra-retinal fluid volume detected in the series of OCT imaging sessions of the retina is reducing in volume during the intra-retinal fluid regression interval. In some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculating, by the computer system, an intra-retinal fluid increase interval, within the treatment interval, during which an intra-retinal fluid volume detected in the series of OCT imaging sessions of the retina is increasing in volume during the intra-retinal fluid increase interval. In some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) determining, by the computer system, a maximum thickness of an intra-retinal fluid volume detected via the series of OCT imaging sessions of the retina during the treatment interval. In some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) determining, by the computer system, a maximum volume of an intra-retinal fluid volume detected via the series of OCT imaging sessions of the retina during the treatment interval.

In some embodiments, the method includes measuring the extent of sub-retinal fluid within the retina. For example, in some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculating, by the computer system at least one sub-retinal fluid present interval, within the treatment interval, during which a sub-retinal fluid volume is detected in each of the series of OCT imaging sessions of the retina accomplished within the sub-retinal fluid present interval. In some embodiments, the method includes calculating, by the computer system, a sub-retinal fluid absence interval, within the treatment interval, during which a sub-retinal fluid volume is not detected in each of the series of OCT imaging sessions of the retina accomplished within the sub-retinal fluid absence interval. In some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculating, by the computer system a sub-retinal fluid regression interval, within the treatment interval, during which a sub-retinal fluid volume detected in the series of OCT imaging sessions of the retina is reducing in volume during the sub-retinal fluid regression interval. In some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) calculating, by the computer system, a sub-retinal fluid increase interval, within the treatment interval, during which a sub-retinal fluid volume detected in the series of OCT imaging sessions of the retina is increasing in volume during the sub-retinal fluid increase interval. In some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) determining, by the computer system, a maximum thickness of an sub-retinal fluid volume detected via the series of OCT imaging sessions of the retina during the treatment interval. In some embodiments, the method includes: (a) storing, by the computer system, a first date of treatment for a first treatment of the retinal disease, (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment, and (c) determining, by the computer system, a maximum volume of a sub-retinal fluid volume detected via the series of OCT imaging sessions of the retina during the treatment interval.

In some embodiments, the method includes monitoring, by the computer system, compliance of a subject with a specified schedule for imaging of the subject's retina. For example, in some embodiments of the method, the OCT imaging data comprises imaging date data indicative of a date of occurrence of each of the series of OCT imaging sessions of the retina and the method includes: (a) processing, by the computer system, the imaging date data to monitor for non-compliance by the subject with a specified schedule for conducting the series of OCT imaging sessions of the retina, and (b) in response to detecting non-compliance by the subject with the specified schedule for conducting the series of OCT imaging sessions of the retina, transmitting, by the computer system, a reminder to the subject to comply with the specified schedule for conducting the series of OCT imaging sessions of the retina.

In some embodiments, the method includes assessing, by the computer system, the severity of the subject's retinal disease. For example, in some embodiments, the method includes generating, by the computer system, a severity score indicative of a severity of the retinal disease based on the OCT imaging data.

In some embodiments, the method includes generating, by the computer system, a recommendation for a treatment of a subject's retinal disease. For example, in some embodiments, the method includes generating, by the computer system, a recommendation for a treatment of the retinal disease based on the OCT imaging data. The recommendation for the treatment can include a recommended date for an injection of a therapeutic compound into the eye. The recommendation for the treatment can include a recommended volume of a therapeutic compound for injection into the eye and/or a recommended composition of a therapeutic compound for injection into the eye.

The method can include tracking, by the computer system, the state of any suitable retinal disease. For example, retinal diseases that can be tracked via the method include pigment epithelium detachment, Drusen, chorio-retinal eye diseases, such as AIMD, ocular hystoplasmosis, myopia, central serous retinopathy, central serous choroidopathy, glaucoma, diabetic retinopathy, retintis pigmentosa, optic neuritis, epiretinal membrane, vascular abnormalities and/or occlusions, choroidal dystrophies, retinal dystrophies, macular hole, or choroidal or retinal degeneration.

For a fuller understanding of the nature and advantages of the present invention, reference should be made to the ensuing detailed description and accompanying drawings.

DETAILED DESCRIPTION

Figure 1:
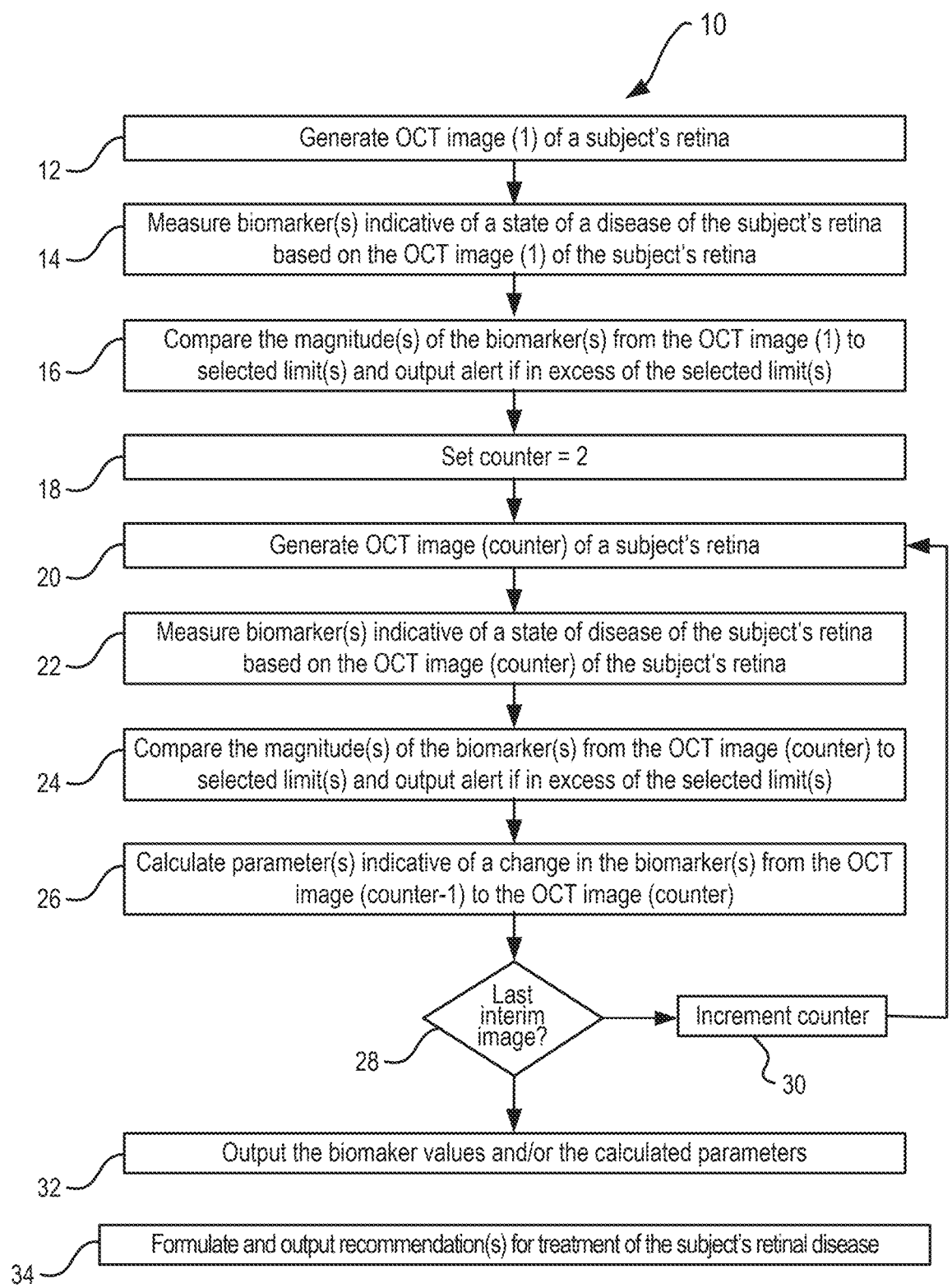
FIG. 1 is a simplified schematic diagram of a method of monitoring a subject's retinal disease, in accordance with embodiments.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

INTRODUCTION

Many subjects with retinal diseases are treated with intra-ocular injection per general guidelines based on the average subject. Progression of a retinal disease in any specific subject, may progress differently than in the average subject. Moreover, the specific subject may respond differently to treatment than the average subject. Accordingly, there is a strong clinical need to monitor the progression of a retinal disease in some subjects on a short-interval basis so that the subject can receive treatment based on their own disease progression. Ophthalmic imaging devices employing optical coherence tomography (OCT) imaging are often employed in eye clinics to image a subject's retina to assess the health of a subject's retina and/or to assess the state of a subject's retinal disease. Having to travel to an eye clinic, however, may prevent the accomplishment of sufficiently short-interval repeat imaging of the subject's retina suitable for adequately monitoring the state of the subject's retinal disease. Retinal diseases that may be suitable for management via repeat OCT imaging on a short-interval basis include, but are not limited to, chorio-retinal eye diseases, such as AMD, ocular hystoplasmosis, myopia, central serous retinopathy, central serous choroidopathy, glaucoma, diabetic retinopathy, retintis pigmentosa, optic neuritis, epiretinal membrane, vascular abnormalities and/or occlusions, choroidal dystrophies, retinal dystrophies, macular hole, or choroidal or retinal degeneration.

In many embodiments described herein, an affordable OCT based ophthalmic imaging device is used by a subject during a series of OCT imaging sessions conducted on a short-interval basis to generate a corresponding series of OCT images of the subject's retina to monitor the state of the subject's retinal disease. As used herein, "short-interval basis" refers to any suitable interval between the OCT imaging sessions of the series of OCT imaging sessions so as to generate one or more OCT images of the subjects in a time period between treatments of the subject's retinal disease (e.g., injection of a therapeutic compound into the subject's eye), which often are spaced at least four weeks apart. Each subject may have a specific maximum interval between the generation of OCT images of the subject's retina sufficient to adequately monitor the state of the subject's retinal disease. A maximum interval between the generation of OCT images of the subject's retina for a particular subject can be selected by the subject's treating medical professional. Maximum intervals for the generation of OCT images of the subject's retina for a particular subject can include, but are not limited to, at least once per day, at least once every two days, at least once every three days, at least once every week, and at least once every two weeks. Short-interval basis OCT imaging of a subject's retina may enable improved monitoring of the state of the subject's retinal disease and the development of a customized treatment regime for the subject. In some embodiments, the short-interval basis OCT imaging of the subject's retina is used to determine when to induce remote therapy via injection of a therapeutic compound into the subject's eye by a remote pump that is fluidly coupled with the subject's eye.

Any suitable parameter, or combination of suitable parameters, can be used to track the progress of a retinal disease of a subject. For example, in some embodiments described herein, a fluid volume within the subject's retina (e.g., intra-retinal fluid volume, sub-retinal fluid volume) is measured via short-interval basis OCT imaging of the subject's retina using an OCT based ophthalmic imaging devices that is used by a subject remotely (e.g., at home).

In some embodiments, the amount of fluid within the subject's retina is plotted to graphically illustrate how the amount of fluid within the subject's retina changes on a selected periodic basis (e.g., day to day). The resulting plot can be used to illustrate the effect over time of the application of a suitable therapeutic compound and/or treatment on the state of a subject's retinal disease. The resulting plot can also be used to illustrate differences in the effect over time of the application of a suitable therapeutic compound and/or treatment on the state of the retinal disease of different subjects.

Any suitable biomarker indicative of the state of a subject's retinal disease, and the progression and remission of the extent of the biomarker, can be evaluated using the systems and/or approaches described herein. Suitable biomarkers include, but are not limited to, intra-retinal fluid (TRF), sub-retinal fluid (SRF), pigment epithelium detachment (PED), Drusen, and Macular holes.

In some embodiments, a data set indicative of the extent of a suitable biomarker is evaluated by an algorithm that generates a recommendation regarding the next therapy application for treating the subject's retinal disease. The recommendation generated can include, for example, a recommended date for the next visit to a clinic for assessment and/or treatment of the subject's retinal disease, a recommended date for the next injection of a therapeutic compound into the subject's eye to treat the subject's retinal disease, and/or a recommended type of therapeutic compound (e.g., injection volume, drug combination).

Remote Retinal Imaging OCT System Based Retinal Disease Tracking

Referring now to the drawings, in which like reference numerals represent like parts throughout the several views, FIG. 1 shows a simplified schematic diagram of a method 10 of monitoring a subject's retinal disease, in accordance with embodiments. The method 10 is directed to generating output to a subject's treating professional for use in managing treatment of the subject's retinal disease based on short-interval basis OCT imaging of the subject's retina. The short-interval basis OCT imaging of the subject's retina generates a series of OCT images of the subject's retina. The method 10 can be used to remotely monitor the state of a subject's retinal disease over any suitable period of time, such as between clinical visits and/or administration of treatments for the subject's retinal disease.

In act 12, a first OCT image (OCT image (1)) of a subject's retina is generated. The first OCT image can be generated at a suitable interval (such as those described herein) following the beginning of a monitored period of time, such as following the administration of a treatment (e.g., injection of a therapeutic compound into the subject's eye) or following a clinical based OCT imaging of the subject's retina.

In act 14, the first OCT image is processed to measure one or more biomarkers indicative of a state of the subject's retinal disease. Any suitable number and/or type of biomarker can be measured including, but not limited to, those described herein.

In act 16, the biomarker(s) measured in the first OCT image are compared to selected limit(s) for the biomarker(s). If the biomarker(s) measured in the first OCT image exceed the selected limit(s) for the biomarker(s), an alert is generated and outputted to flag the occurrence of the exceedance. In many embodiments, the alert is outputted to a treating medical professional for the subject's retinal disease.

In act 18, a counter is set to 2 for use in generating and processing a second OCT image of the subject's retina in the method 10. For the generation and processing of subsequent OCT images of the subject's retina in the method 10, the counter is incremented in act 30. Act 20 through 26 are repeated for each value of the counter.

In act 20, OCT image (counter) of the subject's retina is generated. The OCT image (counter) can be generated at a suitable interval (such as those described herein) following the generation of the OCT image (counter-1).

In act 22, the OCT image (counter) is processed to measure one or more biomarkers indicative of a state of the subject's retinal disease. In many embodiments, the biomarker(s) measured are the same as are measured in each of the OCT images of the series of OCT images measured in the method 10.

In act 24, the biomarker(s) measured in the OCT image (counter) are compared to the selected limit(s) for the biomarker(s). If the biomarker(s) measured in the OCT image (counter) exceed the selected limit(s) for the biomarker(s), an alert is generated and outputted to flag the occurrence of the exceedance. In many embodiments, the alert is outputted to a treating medical professional for the subject's retinal disease.

In act 26, one or more parameters are calculated that are indicative of a change in the magnitude of the biomarker(s) from the OCT image (counter −1) to the OCT image (counter). The calculated parameter(s) reflect whether the state of subject's retinal disease has improved from the OCT image (counter −1) to the OCT image (counter) (e.g., as indicated by a reduction in the magnitude of the biomarker(s)) or whether the state of the subject's retinal disease has worsened from the OCT image (counter −1) to the OCT image (counter) (e.g., indicated by an increase in the magnitude of the biomarker(s)). The one or more calculated parameters can include any suitable parameter calculated from the measured biomarker(s) including, but not limited to, those described herein.

In act 28, if the OCT image (counter) is the last in a specified series of interim OCT images of the subject's retina, the method 10 proceeds to act 32. If the OCT image (counter) is not the last in a specified series of interim OCT images of the subject's retina, the method 10 proceeds to act 30 in which the counter is incremented for the generation and processing of the next OCT image via repeating the accomplishment of act 20 through act 28 for the next OCT image in the series of OCT images of the subject's retina. Act 20 through act 28 are repeated until the last OCT image in the series of OCT images is generated and processed. When the last OCT image in the series of OCT images has been generated and processed, the method 10 proceeds to act 32.

In act 32, the values of the one or more biomarkers and/or the calculated parameters indicative of change of the biomarker(s) between sequential pairs of the OCT images are output. The values of the one or more biomarkers and/or the calculated parameters can be output to any suitable recipient including, but not limited to, a medical professional engaged in the management and/or treatment of the subject's retinal disease.

In act 34, a recommendation for treatment of the subject's retina disease is formulated based on the values of the one or more biomarkers and/or the calculated parameters. The recommendation can include, but is not limited to: (a) a recommended date for an injection of a therapeutic compound into the eye, (b) a recommended volume of a therapeutic compound for injection into the eye, and/or (c) a recommended composition of a therapeutic compound for injection into the eye.

Figure 2:
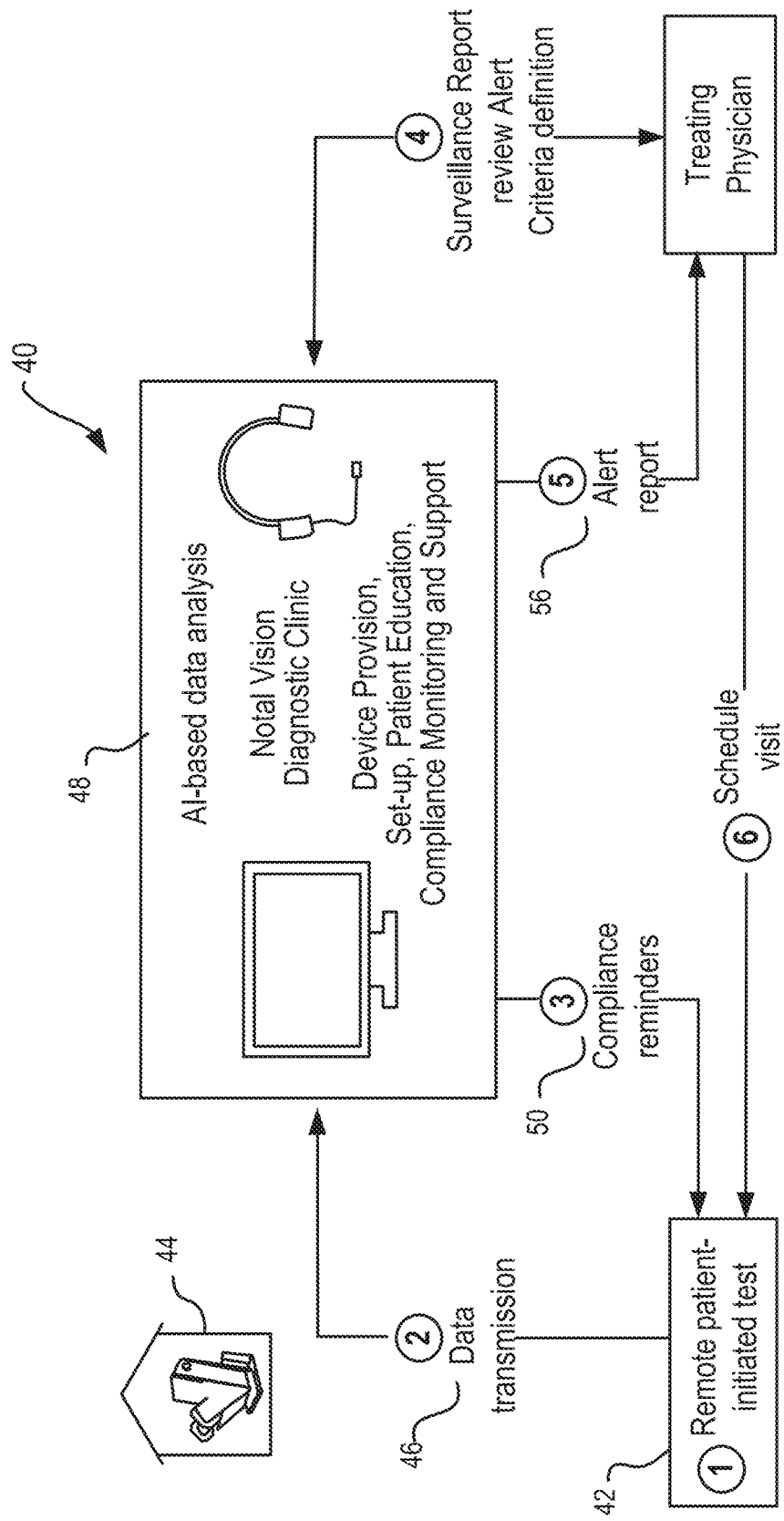
FIG. 2 is a simplified schematic diagram of an approach for accomplishing the method of FIG. 1, in accordance with embodiments.

FIG. 2 shows a simplified schematic diagram of an approach 40 for accomplishing the method 10, in accordance with embodiments. The approach 40 includes short-interval basis repeat generation 42 of OCT image data of a retina of the subject by an OCT based ophthalmic imaging device 44. In many embodiments, the generation 42 of the OCT image data can be repeated with any suitable interval as described herein. Any suitable OCT based ophthalmic imaging device can be used as the imaging device 44, including, but not limited to, an affordable subject-operable OCT imaging device that can be used remotely (e.g., at home) by the subject.

The OCT image data for each imaging session of the subject' retina is transmitted 46 to a retinal disease management system 48. In many embodiments, the OCT image data is separately transmitted to the retinal disease management system 48 for each imaging session of the subject's retina. For example, in some instances, the subject is directed to use the imaging device each day and the resulting OCT image data for the subject's retina is transmitted to the retinal disease management system 48 for each respective daily imaging session.

In many embodiments, the retinal disease management system 48 is web based and configured to manage multiple aspects of tracking the status of a retinal disease in each of multiple subjects. Aspects of tracking the status of a retinal disease in each of multiple subjects that can be managed via the retinal disease management system 48 include, but are not limited to: 1) provision of an instance of the imaging device 44 to each of one or more subjects monitored via the retinal disease management system 48, 2) acquisition and storage of the identification and treatment related data for each of the subjects monitored via the retinal disease management system 48, 3) provision of subject education relating to the usage of the imaging device 44 and/or treatment of the subject's retinal disease, 4) monitoring of compliance with the periodic imaging interval requirement (e.g., daily imaging requirement) by each of the subjects monitored by the retinal disease management system 48, 5) provision of support to users (e.g., subjects, treating physicians) of the retinal disease management system 48 via on-line assistance and/or call-in telephone based assistance, 6) acquisition and storage of the identification and treatment related data for each of the treating physicians for the subjects monitored via the retinal disease management system 48, 7) provision of education to the treating physicians relating to the treatment of the subject's retinal disease, 8) acquisition, from each treating professional, and storage of parameters on which to base surveillance reports and subject alerts that are generated by the retinal disease management system 48 transmitted to the treating professional for each of the subjects monitored via the retinal disease management system 48, and/or 9) generation and transmission of recommended treatment parameters. In some embodiments, the recommended treatment parameters include any suitable combination of: a recommended date for the next visit to a clinic for assessment and/or treatment of the subject's retinal disease, a recommended date for the next injection of a therapeutic compound into the subject's eye to treat the subject's retinal disease, and a recommended type of therapeutic compound (e.g., injection volume, drug combination).

In many embodiments, the retinal disease management system 48 monitors compliance of each of the subjects with an imaging schedule for the subject. The imaging schedule (e.g., calling for daily use of the imaging device 44 by the subject) can be selected by the subject's treating physician. The retinal disease management system 48 can monitor compliance by the subject by comparing receipt of OCT imaging data for the subject with the imaging schedule. When OCT imaging data is not received from the subject in compliance with the imaging schedule for the subject, the retinal disease management system 48 can generate a compliance reminder 50 and transmit the compliance reminder 50 to the subject to remind the subject of the need to use the imaging device 44 in compliance with the subject's imaging schedule.

Figure 3:
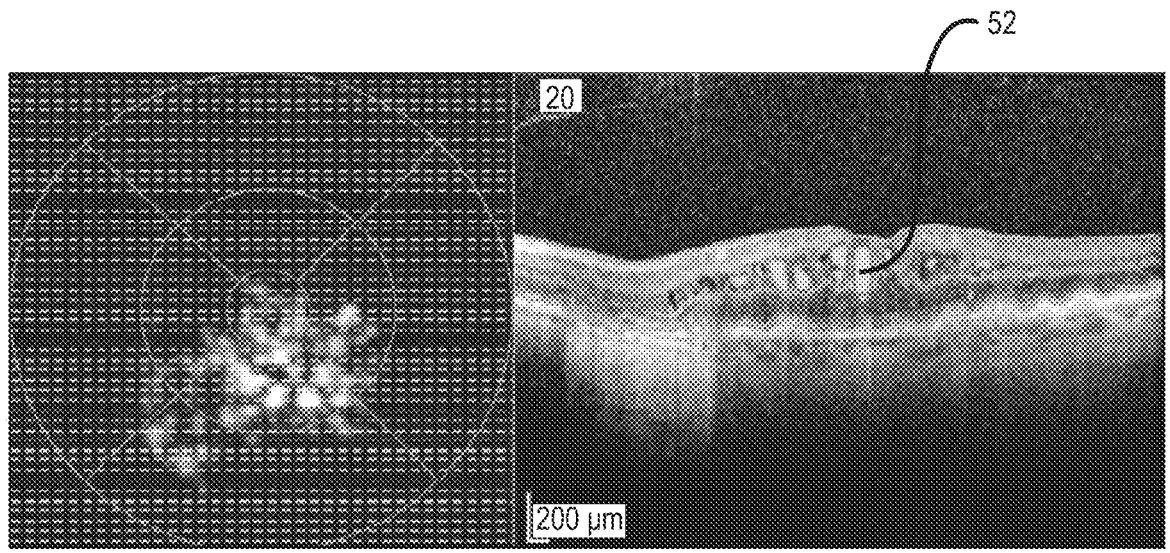
FIG. 3 shows OCT generated images of a retina with intra-retinal fluid, wherein the images are generated via a remote OCT imaging device in accordance with embodiments.
Figure 4:
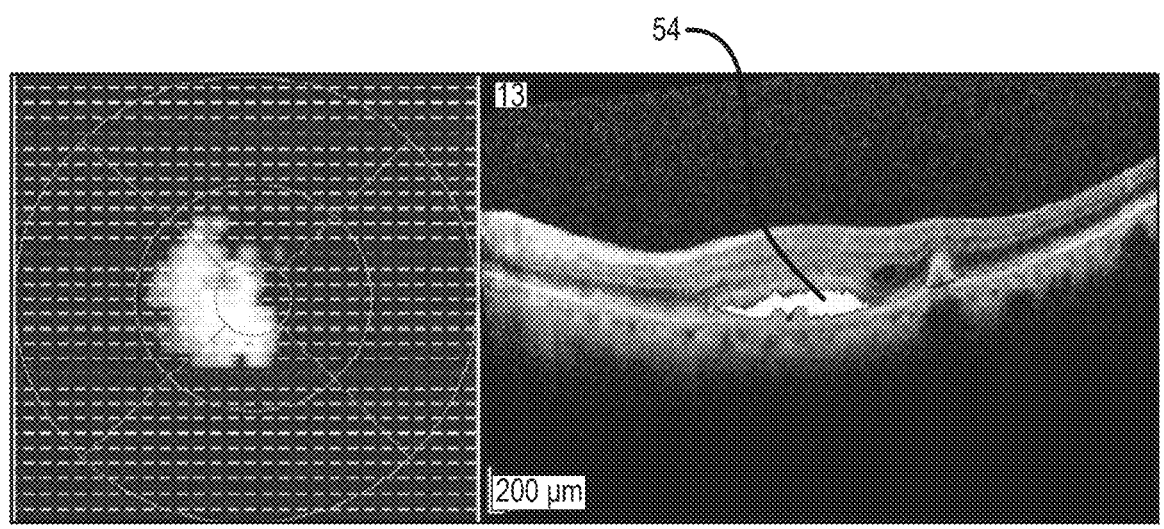
FIG. 4 shows OCT generated images of a retina with sub-retinal fluid, wherein the images are generated via a remote OCT imaging device in accordance with embodiments.

In some embodiments, the retinal disease management system 48 processes the OCT imaging data generated for each imaging session to determine how much intra-retinal fluid and/or sub-retinal fluid is trapped within the respective subject's retina. FIG. 3 shows example OCT generated images of a retina with intra-retinal fluid 52. FIG. 4 shows example OCT generated images of a retina with sub-retinal fluid 54.

Figure 5:
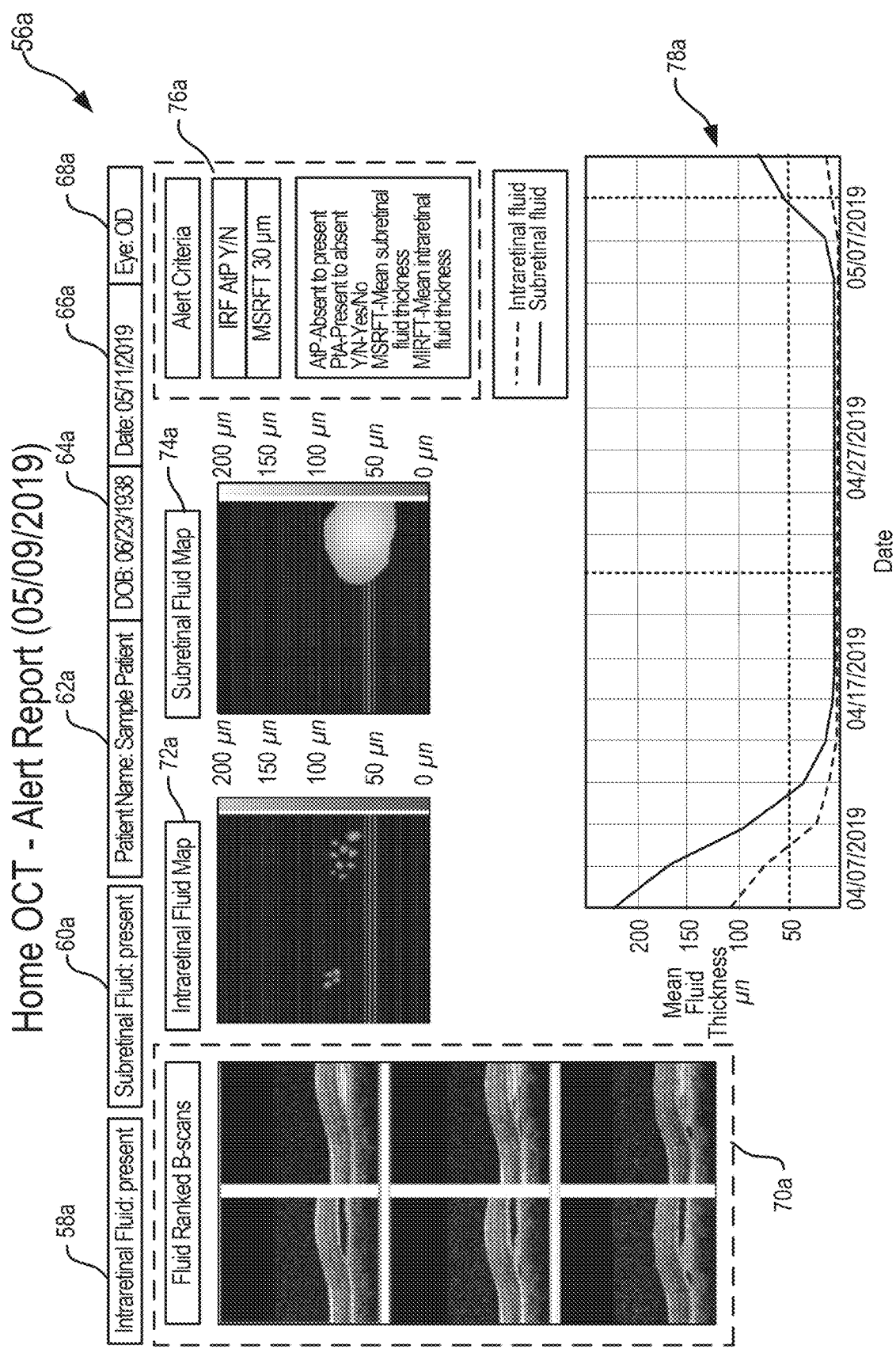
FIG. 5 shows an example report that can be generated in the approach of FIG. 2 for use by a treating medical professional.
Figure 6:
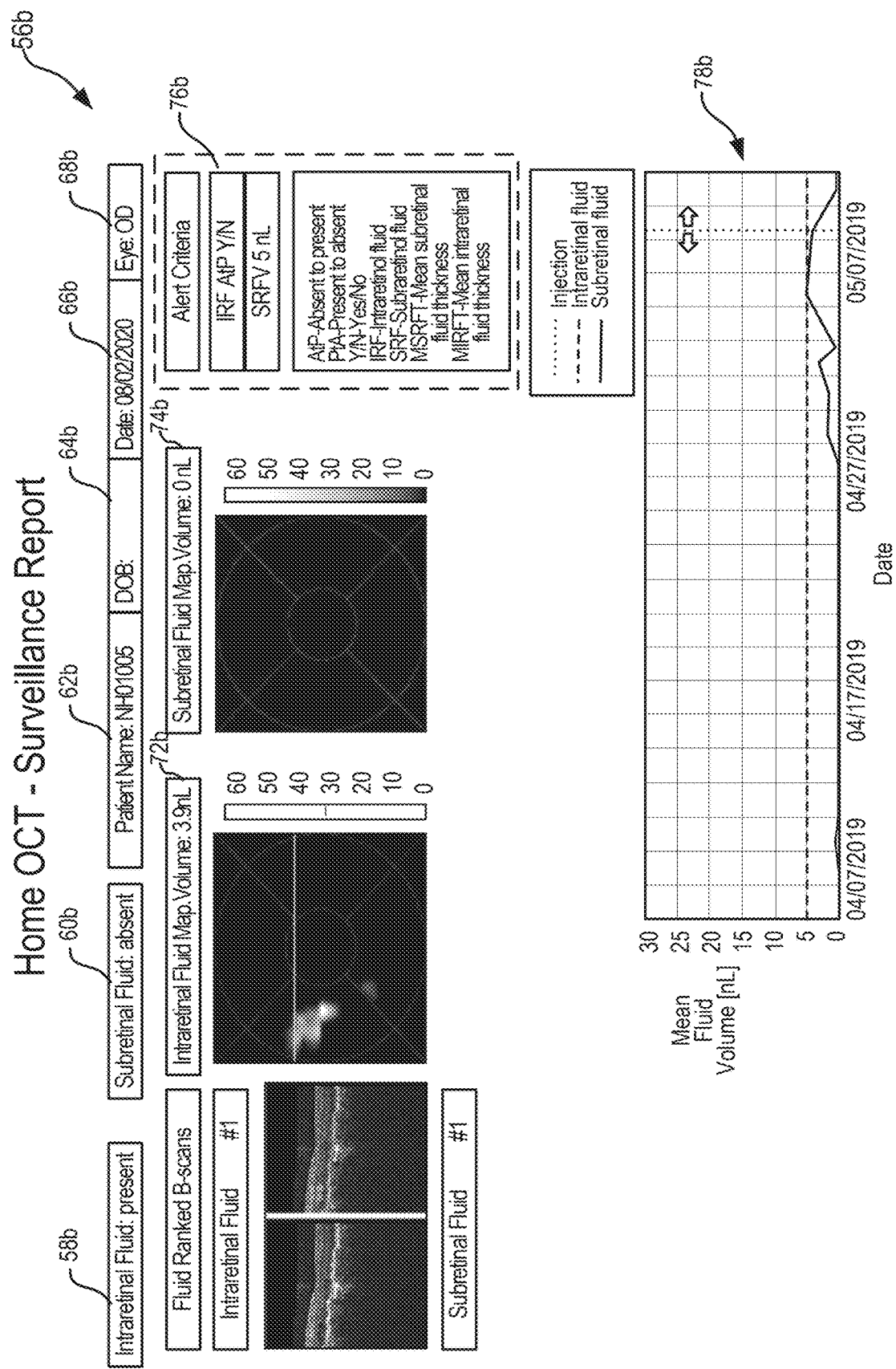
FIG. 6 shows another example report that can be generated in the approach of FIG. 2 for use by a treating medical professional.
Figure 7:
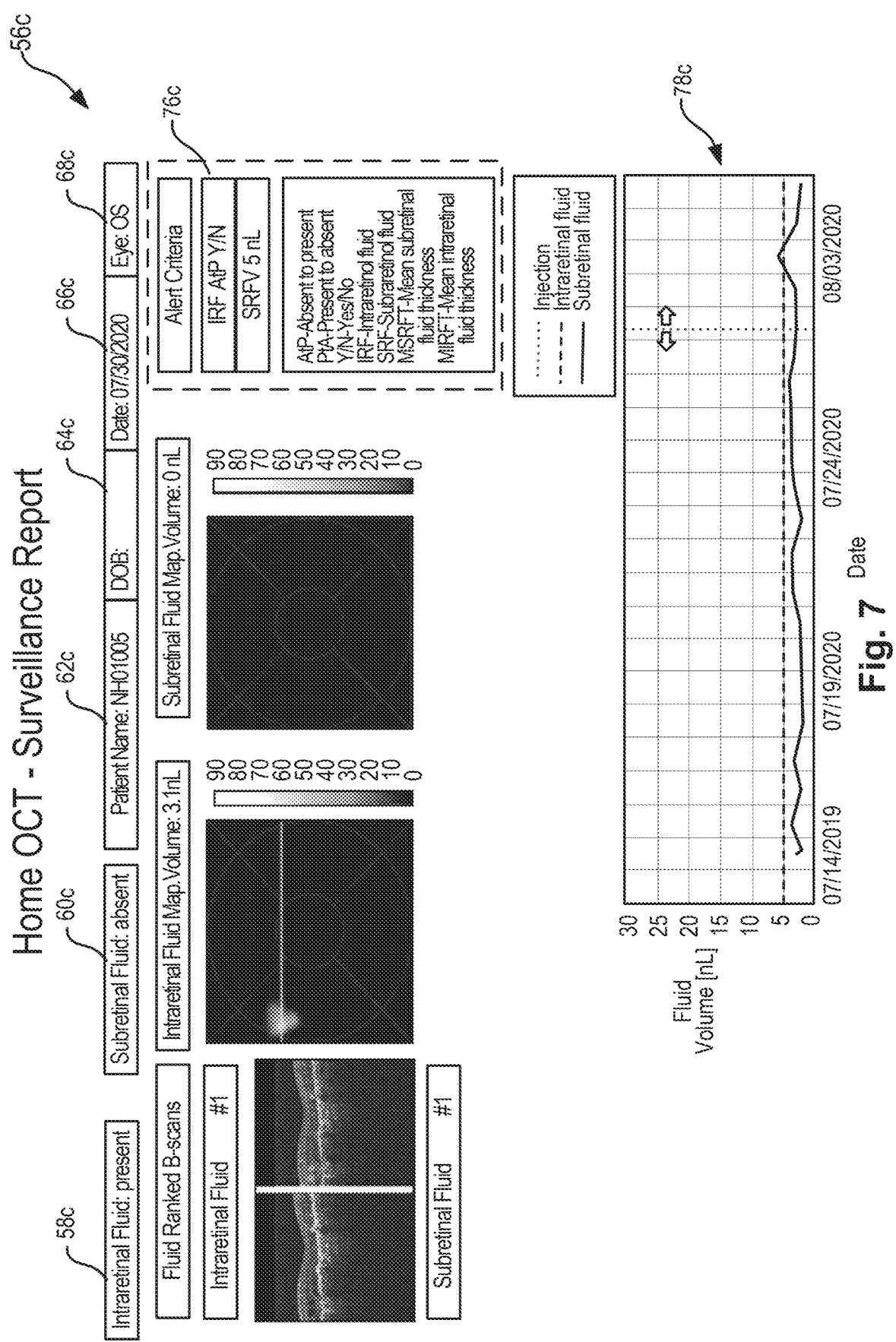
FIG. 7 shows another example report that can be generated in the approach of FIG. 2 for use by a treating medical professional.

In many embodiments, the retinal disease management system 48 process the OCT image data for each of the imaging sessions for each respective subject and generates and transmits surveillance reports and/or alert reports 56 to the subject's treating physician based on the OCT image data received for the subject. Each of FIG. 5, FIG. 6 and FIG. 7 show example alert report (56a, 56b, 56c) that can be generated and transmitted to the respective treating physician by the retinal disease management system 48. Each of the alert reports (56a, 56b, 56c) includes an intra-retinal fluid presence indication output (58a, 58b, 58c), a sub-retinal fluid presence indication output (60a, 60b, 60c), a subject name output (62a, 62b, 62c), a subject date of birth output (64a, 64b, 64c), an imaging date output (66a, 66b, 66c), an imaged eye indication output (68a, 68b, 68c), cross-sectional OCT images of the image retina (70a, 70b, 70c) ordered by cross-sectional area of detected fluid, a plan-view intra-retinal fluid map (72a, 72b, 72c) of intra-retinal fluid within the imaged retina, a plan-view sub-retinal fluid map (74a, 74b, 74c) of sub-retinal fluid within the imaged retina, alert criteria (76a, 76b, 76c) for triggering the generation of the alert report (56a, 56b, 56c), and a plot (78a, 78b, 78c) showing variation in one or more tracked biomarkers indicative of an extent of a subject's retinal disease. The plot (78a, 78b, 78c) can show any suitable tracked biomarker indicative of an extent of a subject's retinal disease or any suitable combination of two or more suitable tracked biomarkers indicative of an extent of a subject's retinal disease. In FIG. 5, the plot 78a shows mean fluid thickness for both intra-retinal fluid and sub-retinal fluid within the imaged retina. In the alert report 56a, the plot 78a shows a reduction of both intra-retinal fluid and sub-retinal fluid thickness within the imaged retina following injection of a therapeutic compound into the eye, followed by a period of time of relatively low intra-retinal fluid and sub-retinal fluid thicknesses, which is followed by increase of both the intra-retinal fluid and sub-retinal fluid thicknesses. In FIG. 6, the plot 78b shows mean fluid volume for both intra-retinal fluid and sub-retinal fluid within the imaged retina. In the alert report 56b, the plot 78b shows a period of time of relatively low intra-retinal fluid and sub-retinal fluid volumes, which is followed by increase in intra-retinal fluid volume. In FIG. 7, the plot 78c shows mean fluid volume for both intra-retinal fluid and sub-retinal fluid within the imaged retina. In the alert report 56c, the plot 78c shows relatively constant sub-retinal fluid volumes with insignificant intra-retinal fluid volumes.

Figure 8:
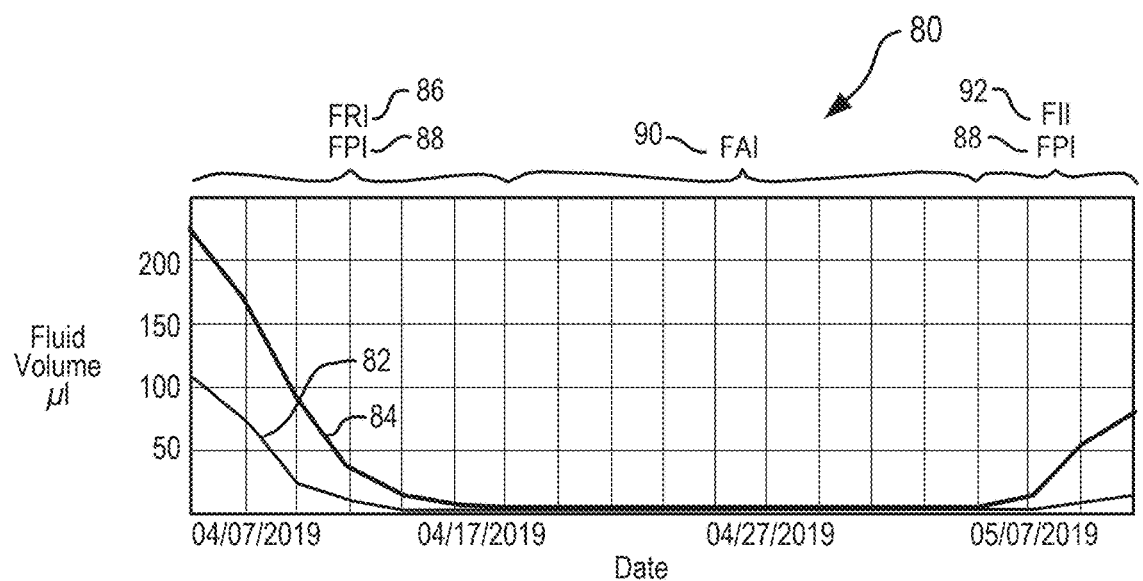
FIG. 8 shows a graph of intra-retinal fluid volume and sub-retinal fluid volume over a span of days between treatments, in accordance with embodiments.

FIG. 8 shows a plot 80 of intra-retinal fluid volume values 82 and sub-retinal fluid volume values 84 over a span of days between treatments, in accordance with embodiments. The retinal disease management system 48 can process the OCT image data for each imaging session of the subject's retina to determine a respective one of the intra-retinal fluid volume values 82 and a respective one of the sub-retinal fluid volume values 84 using approaches described herein. The retinal disease management system 48 can be configured to process the intra-retinal fluid volume values 82 and/or the sub-retinal fluid volume values 84 to determine a fluid regression interval (FRI) 86, a fluid presence interval (FPI) 88, a fluid absence interval (FAI) 90, and a fluid increasing interval (FII) 92. The fluid regression interval (FRI) 86 is the interval of time from a treatment application (e.g., injection of a therapeutic compound into the subject's eye) during which retinal fluid (e.g., intra-retinal fluid, sub-retinal fluid) is present but reducing in volume down to below a measurable level or a selected minimum criteria volume. The fluid presence interval (FPI) 88 is the interval of time from before a treatment application to after a treatment application during which retinal fluid is present in a measurable quantity or above a selected minimum criteria volume. The fluid absence interval (FAI) 90 is the interval of time between two consecutive treatment applications during which retinal fluid is not present in a measurable quantity or is below a selected minimum criteria volume. The fluid increasing interval (FII) 92 is the interval in time before a treatment application during which during which retinal fluid is above a measurable level or a selected minimum criteria volume and increasing in volume. In some embodiments, one or more of the FRI 86, the FPI 88, the FAI 90, and/or the FII 92 are used in isolation and/or in combination to as input parameters to an algorithm used to formulate a treatment recommendation for the subject and/or are output to a treating professional to further quantify the status of the subject's retinal disease and/or how the subject responds to one or more treatment applications.

Figure 9:
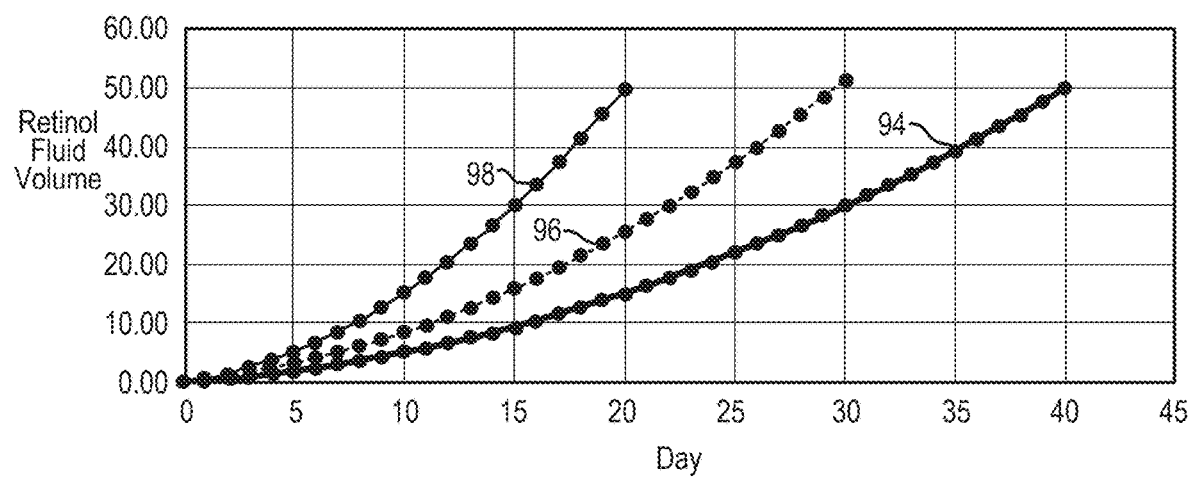
FIG. 9 shows a graph of some different rates of progression of retinal fluid accumulation that can be tracked and identified via the approach of FIG. 2.

FIG. 9 shows a graph of some different example rates of progression of retinal fluid accumulation that can be tracked and identified via the method 10. The retinal fluid progression rates illustrated show retinal fluid progression from 0.0 nanometers to 50.0 nanometers and include an example lower progression curve 94, an example intermediate progression curve 96, and a higher progression curve 98. For the lower progression curve 94, it takes about 30 days for the detected retinal fluid volume to increase from 0.0 nanometers to 30.0 nanoliters and about another 10 days for the retinal fluid volume to increase from 30.0 nanoliters to 50.0 nanoliters. For the intermediate progression curve 96, it takes about 22 days for the detected retinal fluid volume to increase from 0.0 nanometers to 30.0 nanoliters and about another 7.5 days for the retinal fluid volume to increase from 30.0 nanoliters to 50.0 nanoliters. For the higher progression curve 98, it takes about 15 days for the detected retinal fluid volume to increase from 0.0 nanometers to 30.0 nanoliters and about another 5 days for the retinal fluid volume to increase from 30.0 nanoliters to 50.0 nanoliters.

The different example retinal fluid progression rates illustrated in FIG. 9 have different associated treatment windows resulting from the different retinal fluid progression rates. For example, if the criteria for generating the alert report 56 is set at the retinal fluid volume reaching 30 nanoliters, the number of additional days before the retinal fluid volume reaches 50 nanoliters differs for the different illustrated progression rates as described above (i.e., only 5 days for the higher progression curve 98 in contrast to the 10 days for the lower progression curve 94). In order to effect treatment before the retinal fluid level exceeds a selected criteria level (e.g., 50 nanoliters) to avoid excessive retinal fluid volume induced damage, the next treatment application scheduled date can be given priority in the case of the higher exhibited retinal fluid progression rates over lower exhibited retinal fluid progression rates.

In some embodiments, the criteria for generation and transmission of the alert report 56 to the treating physician accounts for differences in progression rates. For example, the criteria for triggering the generation and transmission of the alert report 56 to the treating physician can account for the exhibited daily retinal fluid progression rate between the most recent imaging of the retina and the preceding day's imaging of the retina by lowering the triggering retinal fluid volume for higher retinal fluid volume progression rates relative. For example, if a 10 day treatment window is desired, a look-up table can be configured and accessed so that different exhibited retinal fluid volume progression rates each trigger the generation and transmission of the alert report 56 to the treating physician so as to leave an anticipated 10 day treatment window before a projected retinal fluid volume exceeds a selected maximum pre-treatment retinal fluid volume. Assuming a maximum pre-treatment retinal fluid volume of 50 nanometers and a desired 10 day treatment window, the amount of increase in retinal fluid volume from day 29 to day 30 for the lower retinal fluid volume progression curve 94 (which is approximately 1.72 nanometers/day) can be associated with a 30.0 nanometer alert limit, which is met on day 30, thereby triggering the generation and transmission of the alert report 56 on day 30, thereby leaving 10 days before the retinal fluid volume is projected to reach the selected maximum pre-treatment retinal fluid volume of 50 nanometers. For the intermediate retinal fluid volume progression curve 96, the amount of increase in retinal fluid volume from day 18 to day 19 (which is approximately 2.02 nanometers/day) can be associated with a 23.4 nanometer alert limit, which is met on day 19, thereby triggering the generation and transmission of the alert report 56 on day 19, thereby leaving 10.5 days before the retinal fluid volume is projected to reach the selected maximum pre-treatment retinal fluid volume of 50 nanometers. For the higher retinal fluid volume progression curve 98, the amount of increase in retinal fluid volume from day 9 to 10 (which is approximately 2.40 nanometers/day) can be associated with a 15.0 nanometer alert limit, which is met on day 10, thereby triggering the generation and transmission of the alert report 56 on day 10, thereby leaving 10.0 days before the retinal fluid volume is projected to reach the selected maximum pre-treatment retinal fluid volume of 50 nanometers.

Figure 10:
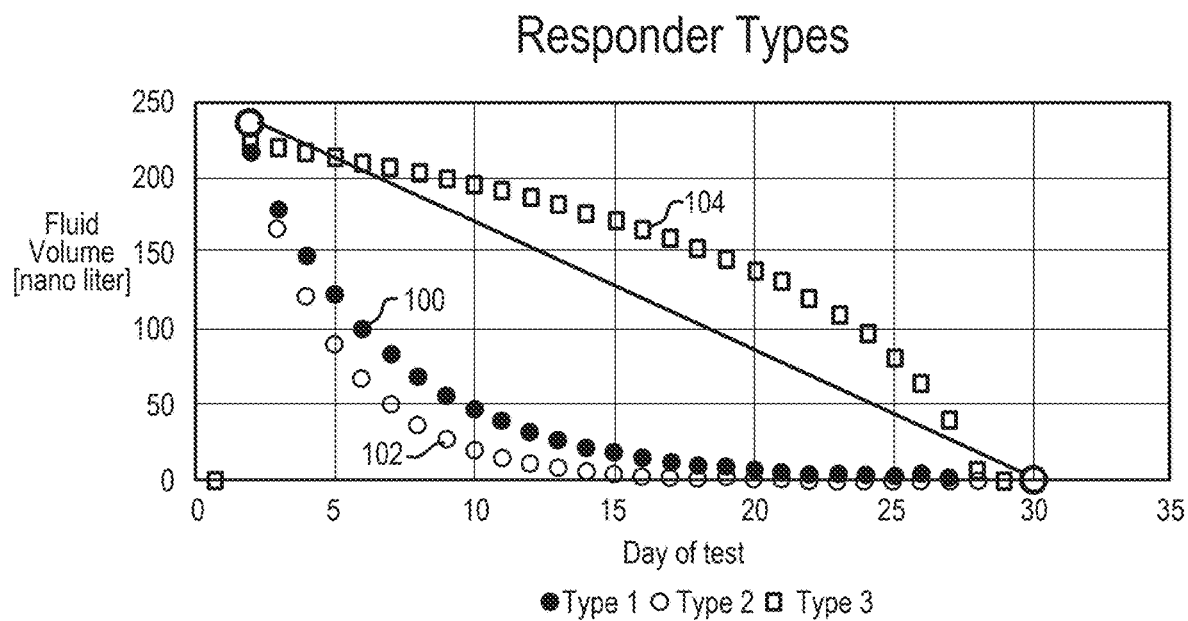
FIG. 10 shows a graph of some different types of responders to a treatment application that can be tracked and identified via the approach of FIG. 2.

FIG. 10 shows a graph of some different types of responders to a treatment application that can be tracked and identified via the method 10. The illustrated types of responders include an example intermediate responder 100, an example fast responder 102, and an example slow responder 104. For the illustrated example intermediate responder 100, the fluid volume reduces from an initial 240 nanometers to 50 nanometers in about 10 days. For the example fast responder 102, the fluid volume reduces from an initial 240 nanometers to 50 nanometers in about 7 days. In contrast, for the example slow responder 104, the fluid volume reduces from an initial 240 nanometers to 50 nanometers in about 27 days. In some embodiments, the observed response of a particular subject to a specific treatment is classified into a suitable type of response (such as one of a fast responder, an intermediate responder, and a slow responder) and the classification of the response provided to the treating professional along with a recommendation regarding a future treatment application for the subject that is based on the classification of the subject's response combined with details of the treatment application that produced the observed response.

Figure 11:
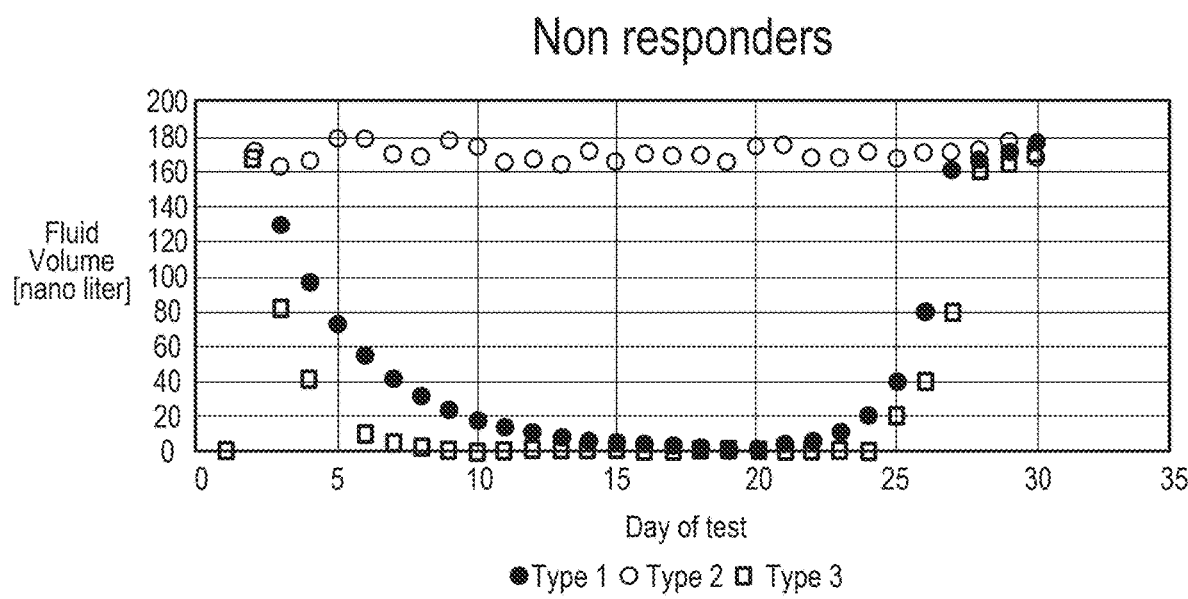
FIG. 11 shows a graph illustrating a non-responder to a treatment application that can be tracked and identified via the approach of FIG. 2.

FIG. 11 shows a graph illustrating an example non-responder 110 to a treatment application that can be tracked and identified via the method 10. To help illustrate differences between subjects that may occur between treatment applications, the graph includes an example intermediate responder 112 and a fast responder 114. If the retinas of the three illustrated responders types are only imaged at a clinic concurrent with the treatment applications (which in the illustrated example occur at day 0 and day 30), each of the subject's retinal disease would exhibit the same retinal fluid volume. In contrast, with the addition of additional remote imaging between treatment applications (which in the illustrated example occur on a daily basis), the differences in response between the example non-responder 110, the example intermediate responder 112, and the fast responder 84 are observable and can form at least part of the basis on which to select suitable follow-on treatments for each of the subject's retinal disease, especially for the non-responder 110 via selection of a different treatment regime(s) in view of the non-response to the prior treatment application.

Table 1 lists example parameters regarding a subject's retinal disease that can be quantified for each OCT imaging of a subject's retina.

| Item | Format |
|---|---|
| File name | .avi |
| Analysis eligibility | −1/0/1/2 |
| Fluid score | −36 to +36 |
| IRF and/or SRF | 0/1 |
| VMI abnormalities | 0/1/2 |
| Retinal volume | mm^3 |
| Fluid volume | mm^3 |
| IRF | 0/1 |
| IRF volume | mm^3 |

-continued

| Item | Format |
| --- | --- |
| SRF | 0/1 |
| SRF volume | mm^3 |
| RPE irregularities | 0/1 |
| PED | 0/1 |
| Section with most evidence of RPE irregularities | Ordinal # |
| Volume of RPE irregularities | mm^3 |
| Normal | 0/1 |
| Average retinal height | microns |
| Analyzed en-face area | mm^2 |
| Maximal height of RPE irregularities | microns |
| Section with highest RPE irregularity (max height) | Ordinal # |
| Corrected average IRF height | microns |
| Average SRF height | microns |
| Corrected fluid height | microns |
| Average RPE irregularities height | microns |
| Central subfield thickness (CST) | microns |
| B-scan with most evidence of fluid | Ordinal # |
| B-scan with second highest level of evidence of fluid | Ordinal # |
| B-scan with third highest level of evidence of fluid | Ordinal # |

The parameters in Table 1 can be used by a treating professional to track and/or formulate future treatments for a subject's retina. The parameters in Table 1 can be quantified for each OCT imaging of a subject's retina using suitable image processing approaches, including, but not limited to, the imaging processing approaches described herein.

Fluid Volume Determination

In many embodiments of the method 10, the OCT image data for each imaging session of a subject' retina is processed using a suitable image processing approach to detect if there is retinal fluid present (e.g., intra-retinal fluid volume and/or sub-retinal fluid volume) and, if so, the volume(s) of the retinal fluid. For example, in some embodiments, a selection of parallel OCT B scans (each of which correspond to a cross-sectional OCT image of the retina) are processed to detect if the B scan includes any retinal fluid areas and, if so, the area(s) of the retinal fluid in the B scan. The volume of the retinal fluid can then be calculated from the fluid areas in each of the selection of parallel OCT B scans and the distances between adjacent of the B scans using equation 1.

$$FV_i = (FA_i + FA_{i+1}) * 0.5 * DT/2 + (FA_i + FA_{i-1}) * 0.5 * DT/2 \quad \text{(equation 1)}$$

where:
$FA_i$ is the area of retinal fluid in B $scan_i$,
$FA_{i+1}$ is the area of retinal fluid in B $scan_{i+1}$,
$FA_{i-1}$ is the area of retinal fluid in B $scan_{i-1}$, and
DT=distance between adjacent B scans.

Example 1 is a system for tracking progress of a retinal disease of an eye of a subject. The example 1 system includes a communication unit, at least one processor, and a tangible storage device. The communication unit is configured to receive optical coherence tomography (OCT) image data of a retina of a subject for each of a series of OCT imaging sessions of the retina having an imaging frequency of 2 weeks or less. The tangible storage device stores non-transitory instructions that are executable by the at least one processor to cause the at least one processor to: (a) process the OCT image data of the retina to determine a series of measured extent values, wherein each of the series of measured extent values is indicative of a respective extent of the retinal disease; and (b) generate an output indicative of the series of measured extent values.

Example 2 is a system in accordance with the example 1 system. In the example 2 system, the series of OCT imaging sessions is conducted over a time span of at least one month.

Example 3 is a system in accordance with the example 1 system. In the example 3 system, the series of OCT imaging sessions has an imaging frequency of at least one every 1 week.

Example 4 is the system of example 3, wherein the series of OCT imaging sessions is conducted over a time span of at least one month.

Example 5 is a system in accordance with the example 1 system. In the example 5 system, the series of OCT imaging sessions has an imaging frequency of at least one every 3 days.

Example 6 is a system in accordance with the example 5 system. In the example 6 system, the series of OCT imaging sessions is conducted over a time span of at least one month.

Example 7 is a system in accordance with the example 1 system. In the example 7 system, the series of OCT imaging sessions has an imaging frequency of at least once every 1 day.

Example 8 is a system in accordance with the example 7 system. In the example 8 system, the series of OCT imaging sessions is conducted over a time span of at least one month.

Example 9 is a system in accordance with any one of the examples 1 through 8 systems. In the example 9 system, at least one of the series of measured extent values is indicative of a length of an intra-retinal fluid volume detected via the series of OCT imaging sessions of the retina.

Example 10 is a system in accordance with any one of the examples 1 through 8 systems. In the example 10 system, at least one of the series of measured extent values is indicative of a depth of an intra-retinal fluid volume detected via the series of OCT imaging sessions of the retina.

Example 11 is a system in accordance with any one of the examples 1 through 8 systems. In the example 11 system, at least one of the series of measured extent values is indicative of a volume of an intra-retinal fluid volume detected via the series of OCT imaging sessions of the retina.

Example 12 is a system in accordance with any one of the examples 1 through 8 systems. In the example 12 system, at least one of the series of measured extent values is indicative of a length of a sub-retinal fluid volume detected via the series of OCT imaging sessions of the retina.

Example 13 is a system in accordance with any one of the examples 1 through 8 systems. In the example 13 system, at least one of the series of measured extent values is indicative of a depth of a sub-retinal fluid volume detected via the series of OCT imaging sessions of the retina.

Example 14 is a system in accordance with any one of the examples 1 through 8 systems. In the example 14 system, at least one of the series of measured extent values is indicative of a volume of a sub-retinal fluid volume detected via the series of OCT imaging sessions of the retina.

Example 15 is a system in accordance with any one of the examples 1 through 8 systems. In the example 15 system, the non-transitory instructions further cause the at least one processor to: (a) compare at least one of the series of measured extent values with a respective threshold extent value; and (b) in response to at least one of the series of measured extent values equaling or exceeding the respective threshold extent value, transmit a communication to a treating professional when at least one of the series of measured extent values exceeds the respective threshold extent value.

Example 16 is a system in accordance with any one of the examples 1 through 8 systems. In the example 16 system, the non-transitory instructions further cause the at least one processor to: (a) compare at least one of the series of measured extent values with a respective threshold extent value; and (b) in response to at least one of the series of measured extent values equaling or exceeding the respective threshold extent value, induce remote treatment of the retinal disease via operation of an implanted pump to inject a therapeutic compound into the eye.

Example 17 is a system in accordance with any one of the examples 1 through 8 systems. In the example 17 system, the non-transitory instructions further cause the at least one processor to transmit at least one of the series of measured extent values to a treating professional to enable tracking of the progress of the retinal disease by the treating professional.

Example 18 is a system in accordance with the example 17 system. In the example 18 system, the non-transitory instructions further cause the at least one processor to transmit a graph of the at least one of the series of measured extent values to the treating professional.

Example 19 is a system in accordance with the example 17 system. In the example 19 system, the non-transitory instructions further cause the at least one processor to display of the at least one of the series of measured extent values to the treating professional.

Example 20 is a system in accordance with any one of the examples 1 through 8 systems. In the example 20 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculate at least one fluid present interval, within the treatment interval, during which an intra-retinal fluid volume is detected via each of the OCT imaging sessions of the retina accomplished within the fluid present interval.

Example 21 is a system in accordance with the example 20 system. In the example 21 system, the non-transitory instructions further cause the at least one processor to calculate a fluid absence interval, within the treatment interval, during which an intra-retinal fluid volume is not detected via each of the OCT imaging sessions of the retina accomplished within the treatment interval.

Example 22 is a system in accordance with any one of the examples 1 through 8 systems. In the example 22 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculate a fluid regression interval, within the treatment interval, during which an intra-retinal fluid volume detected via the OCT imaging sessions of the retina is reducing in volume during the treatment interval.

Example 23 is a system in accordance with any one of the examples 1 through 8 systems. In the example 23 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculate a fluid increase interval, within the treatment interval, during which an intra-retinal fluid volume detected via the OCT imaging sessions of the retina is increasing in volume during the treatment interval.

Example 24 is a system in accordance with any one of the examples 1 through 8 systems. In the example 24 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) determine a maximum thickness of an intra-retinal fluid volume detected via the OCT imaging sessions of the retina during the treatment interval.

Example 25 is a system in accordance with any one of the examples 1 through 8 systems. In the example 25 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) determine a maximum volume of an intra-retinal fluid volume detected via the OCT imaging sessions of the retina during the treatment interval.

Example 26 is a system in accordance with any one of the examples 1 through 8 systems. In the example 26 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculate at least one fluid present interval, within the treatment interval, during which a sub-retinal fluid volume is detected via each of the OCT imaging sessions of the retina accomplished within the fluid present interval.

Example 27 is a system in accordance with the example 26 system. In the example 27 system, the non-transitory instructions further cause the at least one processor to calculate a fluid absence interval, within the treatment interval, during which a sub-retinal fluid volume is not detected via each of the OCT imaging sessions of the retina accomplished within the treatment interval.

Example 28 is a system in accordance with any one of the examples 1 through 8 systems. In the example 28 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculate a fluid regression interval, within the treatment interval, during which a sub-retinal fluid volume detected via the OCT imaging sessions of the retina is reducing in volume during the treatment interval.

Example 29 is a system in accordance with any one of the examples 1 through 8 systems. In the example 29 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculate a fluid increase interval, within the treatment interval, during which a sub retinal fluid volume detected via the OCT imaging sessions of the retina is increasing in volume during the treatment interval.

Example 30 is a system in accordance with any one of the examples 1 through 8 systems. In the example 30 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) determine a maximum thickness of an sub-retinal fluid volume detected via the OCT imaging sessions of the retina during the treatment interval.

Example 31 is a system in accordance with any one of the examples 1 through 8 systems. In the example 31 system, the non-transitory instructions further cause the at least one processor to: (a) store a first date of treatment for a first treatment of the retinal disease; (b) store a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) determine a maximum volume of a sub-retinal fluid volume detected via the OCT imaging sessions of the retina during the treatment interval.

Example 32 is a system in accordance with any one of the examples 1 through 8 systems. In the example 32 system, the OCT imaging data includes imaging date data indicative of a date of occurrence of each of the OCT imaging sessions of the retina. In the example 32 system, the non-transitory instructions further cause the at least one processor to: (a) process the imaging date data to monitor for non-compliance by the subject with a specified schedule for conducting the OCT imaging sessions of the retina, and (b) in response to detecting non-compliance by the subject with the specified schedule for conducting the OCT imaging sessions of the retina, transmit a reminder to the subject to comply with the specified schedule for conducting the OCT imaging sessions of the retina.

Example 33 is a system in accordance with any one of the examples 1 through 8 systems. In the example 33 system, the non-transitory instructions further cause the at least one processor to generate a severity score indicative of a severity of the retinal disease based on the OCT imaging data.

Example 34 is a system in accordance with any one of the examples 1 through 8 systems. In the example 34 system, the non-transitory instructions further cause the at least one processor to generate a recommendation for a treatment of the retinal disease based on the OCT imaging data.

Example 35 is a system in accordance with the example 34 systems. In the example 34 system, the recommendation for the treatment includes a recommended date for an injection of a therapeutic compound into the eye.

Example 36 is a system in accordance with the example 34 system. In the example 36 system, the recommendation for the treatment includes a recommended volume of a therapeutic compound for injection into the eye.

Example 37 is a system in accordance with the example 34 system. In the example 37 system, the recommendation for the treatment includes a recommended composition of a therapeutic compound for injection into the eye.

Example 38 is a system in accordance with any one of the examples 1 through 8 systems. In the example 38 system, the retinal disease includes pigment epithelium detachment.

Example 39 is a system in accordance with any one of the examples 1 through 8 systems. In the example 39 system, the retinal disease includes Drusen.

Example 40 is a system in accordance with any one of the examples 1 through 8 systems. In the example 40 system, the retinal disease includes a Macular hole.

Example 41 is a method of tracking progress of a retinal disease of a subject. The example 41 method includes: (a) receiving, by a computing system, optical coherence tomography (OCT) image data of a retina of an eye of a subject for each of a series of OCT imaging sessions of the retina having an imaging frequency of 2 weeks or less; (b) processing, by the computer system, the OCT image data of the retina to determine a series of measured extent values, wherein each of the one or more measured extend values is indicative of a respective extent of the retinal disease; and (c) outputting, by the computer system, an output indicative of the series of measured extent values.

Example 42 is a method in accordance with the example 41 method. In the example 42 method, the series of OCT imaging sessions is conducted over a time span of at least one month.

Example 43 is a method in accordance with the example 41 method. In the example 43 method, the series of OCT imaging sessions has an imaging frequency of at least once every 1 week.

Example 44 is a method in accordance with the example 43 method. In the example 44 method, the series of OCT imaging sessions is conducted over a time span of at least one month.

Example 45 is a method in accordance with the example 41 method. In the example 45 method, the series of OCT imaging sessions has an imaging frequency of at least once every 3 days.

Example 46 is a method in accordance with the example 45 method. In the example 46 method, the series of OCT imaging sessions is conducted over a time span of at least one month.

Example 47 is a method in accordance with the example 41 method. In the example 47 method, the series of OCT imaging sessions has an imaging frequency of 1 day or less.

Example 48 is a method in accordance with the example 47 method. In the example 48 method, the series of OCT imaging sessions is conducted over a time span of at least one month.

Example 49 is a method in accordance with any one of the examples 41 through 48 methods. In the example 49 method, at least one of the series of measured extent values is indicative of a length of an intra-retinal fluid volume detected via the series of OCT imaging sessions of the retina.

Example 50 is a method in accordance with any one of the examples 41 through 48 methods. In the example 50 method, at least one of the series of measured extent values is indicative of a depth of an intra-retinal fluid volume detected via the series of OCT imaging sessions of the retina.

Example 51 is a method in accordance with any one of the examples 41 through 48 methods. In the example 51 method, at least one of the series of measured extent values is indicative of a volume of an intra-retinal fluid volume detected via the series of OCT imaging sessions of the retina.

Example 52 is a method in accordance with any one of the examples 41 through 48 methods. In the example 52 method, at least one of the series of measured extent values is indicative of a length of a sub-retinal fluid volume detected via the series of OCT imaging sessions of the retina.

Example 53 is a method in accordance with any one of the examples 41 through 48 methods. In the example 53 method, at least one of the series of measured extent values is indicative of a depth of a sub-retinal fluid volume detected via the series of OCT imaging sessions of the retina.

Example 54 is a method in accordance with any one of the examples 41 through 48 methods. In the example 54 method, at least one of the series of measured extent values is indicative of a volume of a sub-retinal fluid volume detected via the series of OCT imaging sessions of the retina.

Example 55 is a method in accordance with any one of the examples 41 through 48 methods. The example 55 method further includes: (a) comparing, by the computer system, at least one of the series of measured extent values with a respective threshold extent value; and (b) in response to at least one of the series of measured extent values equaling or exceeding the respective threshold extent value, transmitting, by the computer system, a communication to a treating professional when at least one of the series of measured extent values exceeds the respective threshold extent value.

Example 56 is a method in accordance with any one of the examples 41 through 48 methods. The example 56 method further includes: (a) comparing, by the computer system, at least one of the series of measured extent values with a respective threshold extent value; and (b) in response to at least one of the series of measured extent values equaling or exceeding the respective threshold extent value, inducing, by the computer system, remote treatment of the retinal disease via operation of an implanted pump to inject a therapeutic compound into the eye.

Example 57 is a method in accordance with any one of the examples 41 through 48 methods. The example 57 method further includes transmitting, by the computer system, at least one of the series of measured extent values to a treating professional to enable tracking of progress of the retinal disease by the treating professional.

Example 58 is a method in accordance with the example 57 method. The example 58 method further includes transmitting, by the computer system, a graph of the at least one of the series of measured extent values to the treating professional.

Example 59 is a method in accordance with the example 57 method. The example 59 method further includes displaying of the at least one of the series of measured extent values to the treating professional.

Example 60 is a method in accordance with any one of the examples 41 through 48 methods. The example 60 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculating, by the computer system, at least one fluid present interval, within the treatment interval, during which an intra-retinal fluid volume is detected via each of the OCT imaging sessions of the retina accomplished within the fluid present interval.

Example 61 is a method in accordance with the example 60 method. The example 61 method further includes calculating a fluid absence interval, within the treatment interval, during which an intra-retinal fluid volume is not detected via each of the OCT imaging sessions of the retina accomplished within the treatment interval.

Example 62 is a method in accordance with any one of the examples 41 through 48 methods. The example 62 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculating, by the computer system, a fluid regression interval, within the treatment interval, during which an intra-retinal fluid volume detected via the OCT imaging sessions of the retina is reducing in volume during the treatment interval.

Example 63 is a method in accordance with any one of the examples 41 through 48 methods. The example 63 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculating, by the computer system, a fluid increase interval, within the treatment interval, during which an intra-retinal fluid volume detected via the OCT imaging sessions of the retina is increasing in volume during the treatment interval.

Example 64 is a method in accordance with any one of the examples 41 through 48 methods. The example 64 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) determining, by the computer system, a maximum thickness of an intra-retinal fluid volume detected via the OCT imaging sessions of the retina during the treatment interval.

Example 65 is a method in accordance with any one of the examples 41 through 48 methods. The example 65 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) determining, by the computer system, a maximum volume of an intra-retinal fluid volume detected via the OCT imaging sessions of the retina during the treatment interval.

Example 66 is a method in accordance with any one of the examples 41 through 48 methods. The example 66 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculating, by the computer system, at least one fluid present interval, within the treatment interval, during which a sub-retinal fluid volume is detected via each of the OCT imaging sessions of the retina accomplished within the fluid present interval.

Example 67 is a method in accordance with the example 66 method. The example 67 method further includes calculating, by the computer system, a fluid absence interval, within the treatment interval, during which a sub-retinal fluid volume is not detected via each of the OCT imaging sessions of the retina accomplished within the treatment interval.

Example 68 is a method in accordance with any one of the examples 41 through 48 methods. The example 68 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculating, by the computer system, a fluid regression interval, within the treatment interval, during which a sub-retinal fluid volume detected via the OCT imaging sessions of the retina is reducing in volume during the treatment interval.

Example 69 is a method in accordance with any one of the examples 41 through 48 methods. The example 69 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) calculating, by the computer system, a fluid increase interval, within the treatment interval, during which a sub retinal fluid volume detected via the OCT imaging sessions of the retina is increasing in volume during the treatment interval.

Example 70 is a method in accordance with any one of the examples 41 through 48 methods. The example 70 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) determining, by the computer system, a maximum thickness of an sub-retinal fluid volume detected via the OCT imaging sessions of the retina during the treatment interval.

Example 71 is a method in accordance with any one of the examples 41 through 48 methods. The example 71 method further includes: (a) storing, by the computer system, a first date of treatment for a first treatment of the retinal disease; (b) storing, by the computer system, a second date of treatment for a second treatment of the retinal disease, wherein the second treatment of the retinal disease is subsequent to and consecutive with the first treatment of the retinal disease, and wherein a treatment interval extends from the first date of treatment to the second date of treatment; and (c) determining, by the computer system, a maximum volume of a sub-retinal fluid volume detected via the OCT imaging sessions of the retina during the treatment interval.

Example 72 is a method in accordance with any one of the examples 41 through 48 methods. In the example 72 method, the OCT imaging data includes imaging date data indicative of a date of occurrence of each of the OCT imaging sessions of the retina. The example 72 method further includes (a) processing, by the computer system, the imaging date data to monitor for non-compliance by the subject with a specified schedule for conducting the OCT imaging sessions of the retina, and (b) in response to detecting non-compliance by the subject with the specified schedule for conducting the OCT imaging sessions of the retina, transmitting, by the computer system, a reminder to the subject to comply with the specified schedule for conducting the OCT imaging sessions of the retina.

Example 73 is a method in accordance with any one of the examples 41 through 48 methods. The example 73 method further includes generating, by the computer system, a severity score indicative of a severity of the retinal disease based on the OCT imaging data.

Example 74 is a method in accordance with any one of the examples 41 through 48 methods. The example 74 method further includes generating, by the computer system, a recommendation for a treatment of the retinal disease based on the OCT imaging data.

Example 75 is a method in accordance with the example 74 method. In the example 75 method, the recommendation for the treatment includes a recommended date for an injection of a therapeutic compound into the eye.

Example 76 is a method in accordance with the example 74 method. In the example 76 method, the recommendation for the treatment includes a recommended volume of a therapeutic compound for injection into the eye.

Example 77 is a method in accordance with the example 74 method. In the example 77 method, the recommendation for the treatment includes a recommended composition of a therapeutic compound for injection into the eye.

Example 78 is a method in accordance with any one of the examples 41 through 48 methods. In the example 78 method, the retinal disease includes pigment epithelium detachment.

Example 79 is a method in accordance with any one of the examples 41 through 48 methods. In the example 79 method, the retinal disease includes Drusen.

Example 80 is a method in accordance with any one of the examples 41 through 48 methods. In the example 80 method, the retinal disease includes a Macular hole.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system for tracking progress of a retinal disease of an eye of a subject, the system comprising:
   at least one processor; and
   a tangible storage device storing non-transitory instructions that are executable by the at least one processor to cause the at least one processor to:
   receive optical coherence tomography (OCT) image data of a retina of the subject for each of a series of OCT imaging sessions of the retina having an imaging frequency of 2 weeks or less;
   for each of the series of OCT imaging sessions of the retina, process the OCT image data of the retina to:
   check for presence of one or more intra-retinal fluid volumes and/or one or more sub-retinal fluid volumes in the retina; and
   determine one or more measured extents of one or more intra-retinal fluid volumes and/or one or more sub-retinal fluid volumes that are present in the retina;
   form a series of the one or more measured extents of one or more intra-retinal fluid volumes and/or one or more sub-retinal fluid volumes that are present in the retina over the series of OCT imaging sessions of the retina;
   monitor the series of the one or more measured extents of one or more intra-retinal fluid volumes and/or one or more subretinal fluid volumes that are present in the retina for occurrence a combination of a threshold magnitude of and an associated threshold amount of increase in the series of the one or more measured extents of one or more intra-retinal fluid volumes and/or one or more sub-retinal fluid volumes that are present in the retina, wherein the threshold magnitude is greater than a predetermined minimum magnitude, and wherein the associated threshold amount of increase decreases as the threshold magnitude increases; and
   in response to occurrence of the combination of a threshold magnitude of and an associated threshold amount of increase in the series of the one or more measured extents of one or more intra-retinal fluid volumes and/or one or more sub-retinal fluid volumes that are present in the retina, transmit an alert report to a treating clinician indicative of the occurrence of the combination of a threshold magnitude of and an associated threshold amount of increase in the series of the one or more measured extents of one or more intra-retinal fluid volumes and/or one or more sub-retinal fluid volumes that are present in the retina.

2. The system of claim 1, wherein the series of OCT imaging sessions has an imaging frequency of at least one every 3 days.

3. The system of claim 2, wherein the series of OCT imaging sessions is conducted over a time span of at least one month.

4. The system of claim 1, wherein the series of the one or more measured extents of one or more intra-retinal fluid volumes and/or one or more sub-retinal fluid volumes that are present in the retina comprises at least one of:
   a length of an intra-retinal fluid volume present in the retina;
   a depth of an intra-retinal fluid volume present in the retina;
   a volume of an intra-retinal fluid volume present in the retina;
   a length of a sub-retinal fluid volume present in the retina;
   a depth of a sub-retinal fluid volume present in the retina; or a volume of a sub-retinal fluid volume present in the retina.

5. The system of claim 1, wherein the non-transitory instructions further cause the at least one processor to:
compare at least one of the series of the one or more measured extents of one or more intra-retinal fluid volumes and/or one or more sub-retinal fluid volumes that are present in the retina over the series of OCT imaging sessions of the retina with a respective threshold extent value; and
in response to at least one of the series of the one or more measured extents of one or more intra-retinal fluid volumes and/or one or more sub-retinal fluid volumes that are present in the retina over the series of OCT imaging sessions of the retina equaling or exceeding the respective threshold extent value, transmit a corresponding notification to a treating professional.

6. The system of claim 1, wherein the non-transitory instructions further cause the at least one processor to:
compare at least one of the series of the one or more measured extents of one or more intra-retinal fluid volumes and/or one or more sub-retinal fluid volumes that are present in the retina over the series of OCT imaging sessions of the retina with a respective threshold extent value; and
in response to at least one of the series of the one or more measured extents of one or more intra-retinal fluid volumes and/or one or more sub-retinal fluid volumes that are present in the retina over the series of OCT imaging sessions of the retina equaling or exceeding the respective threshold extent value, induce remote treatment of the retinal disease via operation of an implanted pump to inject a therapeutic compound into the eye.

7. The system of claim 1, wherein the non-transitory instructions further cause the at least one processor to transmit at least one of the series of the one or more measured extents of one or more intra-retinal fluid volumes and/or one or more sub-retinal fluid volumes that are present in the retina over the series of OCT imaging sessions of the retina to a treating professional to enable tracking of the progress of the retinal disease by the treating professional.

8. The system of claim 7, wherein the non-transitory instructions further cause the at least one processor to transmit a graph of the series of the one or more measured extents of one or more intra-retinal fluid volumes and/or one or more sub-retinal fluid volumes that are present in the retina over the series of OCT imaging sessions of the retina to the treating professional.

9. The system of claim 7, wherein the non-transitory instructions further cause the at least one processor to display the series of the one or more measured extents of one or more intra-retinal fluid volumes and/or one or more sub-retinal fluid volumes that are present in the retina over the series of OCT imaging sessions of the retina to the treating professional.

10. The system of claim 1, wherein:
the non-transitory instructions further cause the at least one processor to process the series of the one or more measured extents of one or more intra-retinal fluid volumes and/or one or more subretinal fluid volumes that are present in the retina over the series of OCT imaging sessions of the retina to identify at least one retinal fluid present interval during which an intra-retinal fluid volume and/or a subretinal fluid volume is identified in each of two or more consecutive OCT imaging sessions of the series of OCT imaging sessions of the retina; and
the at least one retinal fluid present interval comprises at least one intra-retinal fluid present interval during which an intra-retinal fluid volume is identified in each of the two or more consecutive OCT imaging sessions of the series of OCT imaging sessions of the retina.

11. The system of claim 10, wherein the non-transitory instructions further cause the at least one processor to calculate an intra-retinal fluid absent interval during which an intra-retinal fluid volume is not identified in each of two or more consecutive OCT imaging sessions of the series of OCT imaging sessions of the retina.

12. The system of claim 1, wherein the non-transitory instructions further cause the at least one processor to:
process the series of the one or more measured extents of one or more intra-retinal fluid volumes and/or one or more subretinal fluid volumes that are present in the retina to identify an intra-retinal fluid regression interval during which an intra-retinal fluid volume identified in each of two or more consecutive OCT imaging sessions of the series of OCT imaging sessions of the retina has reduced in volume.

13. The system of claim 1, wherein the non-transitory instructions further cause the at least one processor to:
process the series of the one or more measured extents of one or more intra-retinal fluid volumes and/or one or more subretinal fluid volumes that are present in the retina to identify an intra-retinal fluid increase interval during which an intra-retinal fluid volume identified in each of two or more consecutive OCT imaging sessions of the series of OCT imaging sessions of the retina has increased in volume.

14. The system of claim 1, wherein the non-transitory instructions further cause the at least one processor to:
process the series of the one or more measured extents of one or more intra-retinal fluid volumes and/or one or more subretinal fluid volumes that are present in the retina to determine a maximum thickness of an intra-retinal fluid volume that is identified via the OCT imaging sessions of the retina.

15. The system of claim 1, wherein the non-transitory instructions further cause the at least one processor to:
process the series of the one or more measured extents of one or more intra-retinal fluid volumes and/or one or more subretinal fluid volumes that are present in the retina to determine a maximum volume of an intra-retinal fluid volume that is identified via the OCT imaging sessions of the retina.

16. The system of claim 1, wherein the non-transitory instructions further cause the at least one processor to:
process the series of the one or more measured extents of one or more intra-retinal fluid volumes and/or one or more subretinal fluid volumes that are present in the retina to identify at least one sub-retinal fluid present interval during which a sub-retinal fluid volume is identified in each of two or more consecutive OCT imaging sessions of the series of OCT imaging sessions of the retina.

17. The system of claim 16, wherein the non-transitory instructions further cause the at least one processor to process the series of the one or more measured extents of one or more intra-retinal fluid volumes and/or one or more subretinal fluid volumes that are present in the retina to identify a sub-retinal fluid absence interval during which a sub-retinal fluid volume is not identified in each of two or more consecutive OCT imaging sessions of the series of OCT imaging sessions of the retina.

18. The system of claim 1, wherein the non-transitory instructions further cause the at least one processor to:
process the series of the one or more measured extents of one or more intra-retinal fluid volumes and/or one or more subretinal fluid volumes that are present in the retina to identify sub-retinal fluid regression interval during which a sub-retinal fluid volume identified in each of at least two consecutive OCT imaging sessions of the series of OCT imaging sessions of the retina has reduced in volume.

19. The system of claim 1, wherein the non-transitory instructions further cause the at least one processor to:
process the series of the one or more measured extents of one or more intra-retinal fluid volumes and/or one or more subretinal fluid volumes that are present in the retina to identify a sub-retinal fluid increase interval during which a sub-retinal fluid volume identified in each of two or more consecutive OCT imaging sessions of the series of OCT imaging sessions of the retina has increased in volume.

20. The system of claim 1, wherein the non-transitory instructions further cause the at least one processor to:
process the series of the one or more measured extents of one or more intra-retinal fluid volumes and/or one or more subretinal fluid volumes that are present in the retina to identify a maximum thickness of a sub-retinal fluid volume that is identified via the OCT imaging sessions of the retina.

21. The system of claim 1, wherein the non-transitory instructions further cause the at least one processor to:
process the series of the one or more measured extents of one or more intra-retinal fluid volumes and/or one or more subretinal fluid volumes that are present in the retina to identify a maximum volume of a sub-retinal fluid volume that is identified via the OCT imaging sessions of the retina.

22. The system of claim 1, wherein:
the OCT imaging data comprises imaging date data indicative of a date of occurrence of each of the OCT imaging sessions of the retina; and
the non-transitory instructions further cause the at least one processor to:
process the imaging date data to monitor for non-compliance by the subject with a specified schedule for conducting the OCT imaging sessions of the retina, and
in response to detecting non-compliance by the subject with the specified schedule for conducting the OCT imaging sessions of the retina, transmit a reminder to the subject to comply with the specified schedule for conducting the OCT imaging sessions of the retina.

23. The system of claim 1, wherein the non-transitory instructions further cause the at least one processor to generate a severity score indicative of a severity of the retinal disease based on the series of the one or more measured extents of one or more intra-retinal fluid volumes and/or one or more sub-retinal fluid volumes that are present in the retina over the series of OCT imaging sessions of the retina.

24. The system of claim 1, wherein the non-transitory instructions further cause the at least one processor to generate a recommendation for a treatment of the retinal disease based on the series of the one or more measured extents of one or more intra-retinal fluid volumes and/or one or more sub-retinal fluid volumes that are present in the retina over the series of OCT imaging sessions of the retina.

25. The system of claim 24, wherein the recommendation for the treatment comprises at least one of a recommended date for an injection of a therapeutic compound into the eye, a recommended volume of a therapeutic compound for injection into the eye, or a recommended composition of a therapeutic compound for injection into the eye.

* * * * *